(12) United States Patent
Berlin et al.

(10) Patent No.: US 12,170,909 B2
(45) Date of Patent: *Dec. 17, 2024

(54) OPTIMIZING PERFORMANCE BETWEEN A WIRELESS DISTRIBUTION SYSTEM (WDS) AND A MACRO NETWORK(S)

(71) Applicant: CORNING OPTICAL COMMUNICATIONS LLC, Charlotte, NC (US)

(72) Inventors: Igor Berlin, Potomac, MD (US); Dror Harel, Hod Hasharon (IL); Yair Zeev Shapira, Shoham (IL)

(73) Assignee: CORNING OPTICAL COMMUNICATIONS LLC, Charlotte, NC (US)

( * ) Notice: Subject to any disclaimer, the term of this patent is extended or adjusted under 35 U.S.C. 154(b) by 495 days.

This patent is subject to a terminal disclaimer.

(21) Appl. No.: 17/526,028

(22) Filed: Nov. 15, 2021

(65) Prior Publication Data
US 2022/0078639 A1 Mar. 10, 2022

Related U.S. Application Data

(63) Continuation of application No. 16/735,007, filed on Jan. 6, 2020, now Pat. No. 11,178,556, which is a
(Continued)

(51) Int. Cl.
*H04W 24/02* (2009.01)
*H04L 41/0823* (2022.01)
(Continued)

(52) U.S. Cl.
CPC ......... *H04W 24/02* (2013.01); *H04L 41/0823* (2013.01); *H04L 41/0896* (2013.01);
(Continued)

(58) Field of Classification Search
CPC ... H04W 24/02; H04W 24/10; H04W 52/243; H04W 24/08; H04W 84/045;
(Continued)

(56) References Cited

U.S. PATENT DOCUMENTS

| 6,580,926 B1 | 6/2003 | Levy |
| 7,043,274 B2 | 5/2006 | Cuffaro |

(Continued)

FOREIGN PATENT DOCUMENTS

| WO | 2012/044698 A1 | 4/2012 |
| WO | 2013/126845 A1 | 8/2013 |
| WO | 2014/008915 A1 | 1/2014 |

OTHER PUBLICATIONS

Author Unknown, "Technical Specification Group Services and System Aspects; Telecommunication management; Subscriber and equipment trace: Trace concepts and requirements (Release 9)," Technical Specification 32.421, Version 9.0.0, Dec. 2009, 3GPP Organizational Partners, 33 pages.
(Continued)

*Primary Examiner* — Tejis Daya
(74) *Attorney, Agent, or Firm* — William D. Doyle

(57) ABSTRACT

Optimizing performance between a wireless distribution system (WDS) and a macro network(s). In this regard, a macro network optimization system is configured to detect a performance indicator(s) between a WDS and a macro network and optimize the performance of the macro network based on the detected performance indicator(s). The macro network optimization system analyzes a macro network performance report provided by the macro network and/or a WDS performance report provided by the WDS to detect the performance indicator(s) between the WDS and the macro network. The macro network optimization system reconfigures operations of one or more macro network elements to optimize performance between the WDS and the macro
(Continued)

network based on the detected performance indicator(s). By detecting and optimizing performance between the WDS and the macro network, capacity, throughput, and/or coverage of the WDS and the macro network can be improved, thus providing better quality of experience (QoE).

15 Claims, 23 Drawing Sheets

Related U.S. Application Data continuation of application No. 15/834,447, filed on Dec. 7, 2017, now Pat. No. 10,560,855, which is a continuation of application No. PCT/IL2016/050809, filed on Jul. 24, 2016.

(60) Provisional application No. 62/251,939, filed on Nov. 6, 2015, provisional application No. 62/245,499, filed on Oct. 23, 2015, provisional application No. 62/196,579, filed on Jul. 24, 2015.

(51) Int. Cl.
| | |
|---|---|
| *H04L 41/0896* | (2022.01) |
| *H04L 41/50* | (2022.01) |
| *H04L 41/5009* | (2022.01) |
| *H04L 41/5025* | (2022.01) |
| *H04L 41/5067* | (2022.01) |
| *H04W 24/08* | (2009.01) |
| *H04W 24/10* | (2009.01) |
| *H04W 52/24* | (2009.01) |
| *H04W 84/04* | (2009.01) |

(52) U.S. Cl.
CPC ...... *H04L 41/5009* (2013.01); *H04L 41/5025* (2013.01); *H04L 41/5067* (2013.01); *H04W 24/10* (2013.01); *H04W 52/243* (2013.01); *H04L 41/5087* (2013.01); *H04W 24/08* (2013.01); *H04W 84/045* (2013.01)

(58) Field of Classification Search
CPC ............. H04L 41/0823; H04L 41/0896; H04L 41/5009; H04L 41/5025; H04L 41/5067; H04L 41/5087
See application file for complete search history.

(56) References Cited

U.S. PATENT DOCUMENTS

| | | | |
|---|---|---|---|
| 7,388,845 B2 | 6/2008 | Laroia et al. | |
| 7,995,527 B2 | 8/2011 | Li et al. | |
| RE43,964 E | 2/2013 | Fischer et al. | |
| 8,472,409 B2 | 6/2013 | Sun et al. | |
| 8,913,892 B2 | 12/2014 | Berlin et al. | |
| RE45,321 E | 1/2015 | Fischer et al. | |
| 8,989,817 B2 | 3/2015 | Wu et al. | |
| 9,020,555 B2 | 4/2015 | Venkatraman et al. | |
| 9,179,321 B2 | 11/2015 | Hasarchi et al. | |
| 9,271,158 B2 | 2/2016 | Hanson et al. | |
| 9,276,686 B2 | 3/2016 | Soriaga et al. | |
| 10,506,454 B2 | 12/2019 | Stapleton et al. | |
| 2007/0286599 A1* | 12/2007 | Sauer | H04B 10/25754 398/103 |
| 2008/0291856 A1 | 11/2008 | Li et al. | |
| 2009/0196174 A1 | 8/2009 | Ji | |
| 2010/0329198 A1 | 12/2010 | Madan et al. | |
| 2011/0009105 A1 | 1/2011 | Lee et al. | |
| 2011/0151886 A1 | 6/2011 | Grayson et al. | |
| 2012/0039320 A1 | 2/2012 | Lemson et al. | |
| 2012/0077511 A1* | 3/2012 | Shin | H04B 7/022 455/422.1 |
| 2012/0129567 A1* | 5/2012 | Kimura | H04W 52/244 455/522 |
| 2012/0142364 A1* | 6/2012 | Duan | H04W 52/244 455/450 |
| 2012/0314665 A1 | 12/2012 | Ishida et al. | |
| 2013/0028107 A1 | 1/2013 | Ho et al. | |
| 2013/0114963 A1 | 5/2013 | Stapleton et al. | |
| 2013/0170362 A1* | 7/2013 | Futaki | H04W 24/10 370/241.1 |
| 2013/0188624 A1* | 7/2013 | Lee | H04W 24/02 370/338 |
| 2013/0201916 A1 | 8/2013 | Kummetz et al. | |
| 2013/0244718 A1* | 9/2013 | Lee | H04W 36/00835 455/525 |
| 2014/0031049 A1 | 1/2014 | Sundaresan et al. | |
| 2014/0146692 A1 | 5/2014 | Hazani et al. | |
| 2014/0213272 A1 | 7/2014 | Hamabe et al. | |
| 2014/0269318 A1* | 9/2014 | Hasarchi | H04W 88/00 370/235 |
| 2014/0376499 A1 | 12/2014 | Kummetz et al. | |
| 2015/0057039 A1 | 2/2015 | Soriaga et al. | |
| 2016/0135184 A1 | 5/2016 | Zavadsky et al. | |
| 2016/0165469 A1 | 6/2016 | Gopalakrishnan et al. | |
| 2017/0302340 A1 | 10/2017 | Berlin et al. | |
| 2018/0103383 A1 | 4/2018 | Berlin et al. | |
| 2018/0103384 A1 | 4/2018 | Berlin et al. | |

OTHER PUBLICATIONS

Examination Report for European Patent Application No. 16757735.2, dated Feb. 18, 2019, 6 pages.
International Preliminary Report on Patentability for PCT/IL2016/050809, dated Feb. 8, 2018, 11 pages.
International Search Report and Written Opinion for PCT/IL2016/050809, dated Oct. 26, 2016, 14 pages.
International Search Report and Written Opinion of the International Searching Authority; PCT/IL16/050809; Mailed Oct. 26, 2016; 14 Pages; European Patent Office.
International Search Report of the International Searching Authority; PCT/IL2016/050809; Mailed Oct. 26, 2016; 5 Pages; European Patent Office.
Non-Final Office Action for U.S. Appl. No. 15/834,423, dated May 15, 2019, 8 pages.
Non-Final Office Action for U.S. Appl. No. 15/834,447, dated May 30, 2019, 9 pages.

\* cited by examiner

| REPORT SOURCE | REPORT TYPE | DESCRIPTION | DATA COLLECTED BY |
|---|---|---|---|
| WDS (306) | WDS PERFORMANCE REPORT (310) | THE PLURALITY OF RF SIGNAL INFORMATION (344(1)-344(M)) PROVIDED BY THE PLURALITY OF REMOTE UNITS (314(1)-314(M)) EACH INCLUDING SUCH INFORMATION AS FREQUENCY, POWER, PHYSICAL CELL IDENTIFICATION (PCI), GLOBAL CELL IDENTIFICATION (GCI), ETC., OF DOWNLINK SIGNALS EMITTED FROM THE ONE OR MORE INDOOR BASE STATIONS (320(1)-320(L)) AND THE OUTDOOR BASE STATION (334) | THE SAU (354) BASED ON THE PLURALITY OF RF SIGNAL INFORMATION (344(1)-344(M)) RECEIVED FROM THE PLURALITY OF REMOTE UNITS (314(1)-314(M)) |
| | | THE QoE REPORT (346) PROVIDED BY THE INDOOR CLIENT DEVICE (330), INCLUDING SUCH INFORMATION AS RECEIVED SIGNAL LEVEL, SIGNAL TO NOISE RATIO (SNR), SIGNAL TO INTERFERENCE AND NOISE RATIO (SINR), CELL IDENTIFICATION (ID) OF CAMPED/SERVING CELLS AS WELL AS NEIGHBORING CELLS, MODULATION AND CODING SCHEME (MCS), LOCATION OF THE INDOOR CLIENT DEVICE (330), ETC. | THE INDOOR CLIENT DEVICE (330) AND PROVIDED TO THE CLOSEST REMOTE UNIT (314(M)) VIA THE ALTERNATIVE COMMUNICATIONS LINK(348) |
| | | | LOCATION OF THE INDOOR CLIENT DEVICE (330) MAY BE DETERMINED BY THE GEO-LOCATION SERVER (356) |
| | | THE QoE REPORT (346) PROVIDED TO THE ONE OR MORE INDOOR BASE STATIONS (320(1)-320(L)), INCLUDING SUCH DATA AS RECEIVED SIGNAL LEVEL, SNR/SINR, CELL ID OF CAMPED/SERVING CELLS AS WELL AS NEIGHBORING CELLS, MCS, ETC. | THE CONTROLLER (352) BASED ON THE WDS CELL TRACE DATA (366) |
| | | | THE LOCATION OF THE INDOOR CLIENT DEVICE (330) MAY BE IDENTIFIED BY THE GEO-LOCATION SERVER (356) |

FIG. 5

| REPORT SOURCE | REPORT TYPE | DESCRIPTION | DATA COLLECTED BY |
|---|---|---|---|
| WDS (306) | WDS PERFORMANCE REPORT (310) | THE PLURALITY OF RF SIGNAL INFORMATION (344(1)-344(M)) PROVIDED BY THE PLURALITY OF REMOTE UNITS (314(1)-314(M)) EACH INCLUDING SUCH INFORMATION AS FREQUENCY, POWER, PHYSICAL CELL IDENTIFICATION (PCI), GLOBAL CELL IDENTIFICATION (GCI), ETC., OF DOWNLINK SIGNALS EMITTED FROM THE ONE OR MORE INDOOR BASE STATIONS (320(1)-320(L)) AND THE OUTDOOR BASE STATION (334) | THE SAU (354) BASED ON THE PLURALITY OF RF SIGNAL INFORMATION (344(1)-344(M)) RECEIVED FROM THE PLURALITY OF REMOTE UNITS (314(1)-314(M)) |
| | WDS PERFORMANCE REPORT (310) & MACRO NETWORK PERFORMANCE REPORT (372) | THE QoE REPORT (346) PROVIDED BY THE INDOOR CLIENT DEVICE (330), INCLUDING SUCH INFORMATION AS RECEIVED SIGNAL LEVEL, SIGNAL TO NOISE RATIO (SNR), SIGNAL TO INTERFERENCE AND NOISE RATIO (SINR), CELL IDENTIFICATION (ID) OF CAMPED/SERVING CELLS AS WELL AS NEIGHBORING CELLS, MODULATION AND CODING SCHEME (MCS), LOCATION OF THE INDOOR CLIENT DEVICE (330), ETC. | THE INDOOR CLIENT DEVICE (330) AND PROVIDED TO THE CLOSEST REMOTE UNIT (314(M)) VIA THE ALTERNATIVE COMMUNICATIONS LINK (348) |
| | | | LOCATION OF THE INDOOR CLIENT DEVICE (330) MAY BE DETERMINED BY THE GEO-LOCATION SERVER (356) |
| | MACRO NETWORK PERFORMANCE REPORT (372) | THE QoE REPORT (346) PROVIDED TO THE ONE OR MORE INDOOR BASE STATIONS (320(1)-320(L)), INCLUDING SUCH DATA AS RECEIVED SIGNAL LEVEL, SNR/SINR, CELL ID OF CAMPED/SERVING CELLS AS WELL AS NEIGHBORING CELLS, MCS, ETC. | THE CONTROLLER (352) BASED ON THE WDS CELL TRACE DATA (366) |
| | | | THE LOCATION OF THE INDOOR CLIENT DEVICE (330) MAY BE IDENTIFIED BY THE GEO-LOCATION SERVER (356) |
| | | THE CELL TRACE DATA (378) PROVIDED BY THE OUTDOOR BASE STATION (334), INCLUDING SUCH INFORMATION AS FREQUENCY, POWER, PCI, GCI, ETC. | THE CELL TRACE DATA (378) PROVIDED BY THE OUTDOOR BASE STATION (334) |
| MACRO NETWORK (308) | MACRO NETWORK PERFORMANCE REPORT (372) | THE QoE REPORT (346) PROVIDED BY THE INDOOR CLIENT DEVICE (330) AND/OR THE QoE REPORT (376) PROVIDED BY THE OUTDOOR CLIENT DEVICE (338) INCLUDING SUCH INFORMATION AS RECEIVED SIGNAL LEVEL, SNR/SINR, CELL ID OF CAMPED/SERVING CELLS AS WELL AS NEIGHBORING CELLS, MCS, LOCATIONS OF THE INDOOR CLIENT DEVICE (330) AND THE OUTDOOR CLIENT DEVICE (338), ETC. | THE QoE REPORT (346) PROVIDED BY ONE OR MORE INDOOR BASE STATIONS (320(1)-320(L)) VIA THE ONE OR MORE CELL TRACE DATA (380(1)-380(L)) |
| | | | THE QoE REPORT (376) PROVIDED BY THE OUTDOOR BASE STATION (334) VIA THE CELL TRACE DATA (378) AND/OR THE ONE OR MORE INDOOR BASE STATIONS (320(1)-320(L)) VIA THE ONE OR MORE CELL TRACE DATA (380(1)-380(L)) |
| | | CELL STATISTICS OF ONE OR MORE CELLS (NOT SHOWN) IN THE MACRO NETWORK (308), INCLUDING SUCH INFORMATION AS CALL DROP RATE, HANDOVER FAILURE RATE, MCS RELATED INFORMATION, ETC. | THE OUTDOOR BASE STATION (334) AND/OR THE ONE OR MORE INDOOR BASE STATIONS (320(1)-320(L)) |

*FIG. 12*

OPTIMIZING PERFORMANCE BETWEEN A WIRELESS DISTRIBUTION SYSTEM (WDS) AND A MACRO NETWORK(S)

CROSS-REFERENCE TO RELATED APPLICATIONS

This application is a continuation of U.S. application Ser. No. 16/735,007, filed Jan. 6, 2020, which is a continuation of U.S. application Ser. No. 15/834,447, filed Dec. 7, 2017, now U.S. Pat. No. 10,560,855, which is a continuation of International Application No. PCT/IL2016/050809, filed Jul. 24, 2016, which claims priority to U.S. Provisional Application Ser. No. 62/196,579, filed Jul. 24, 2015, and U.S. Provisional Application Ser. No. 62/245,499, filed Oct. 23, 2015, and U.S. Provisional Application Ser. No. 62/251,939, filed Nov. 6, 2015, the content of each being relied upon and incorporated herein by reference in their entireties.

BACKGROUND

The disclosure relates generally to a wireless distribution system (WDS), and more particularly to optimizing performance between a WDS and a macro network(s).

Wireless customers are increasingly demanding digital data services, such as streaming video and other multimedia contents, for example. Some wireless customers use their wireless devices in areas poorly serviced by conventional cellular networks, such as inside certain buildings or areas. One response to the intersection of these two concerns has been the use of WDSs, such as a distributed antenna system (DAS) as an example. A DAS can be particularly useful when deployed inside buildings or other indoor environments where client devices may not otherwise be able to effectively receive RF signals from a base transceiver station (BTS), for example, of a conventional cellular network. The DAS is configured to provide multiple coverage areas inside the buildings to support higher capacity and improved RF coverage. Each coverage area includes one or more remote units configured to provide communications services to the client devices within antenna ranges of the remote units. The remote units in the multiple WDS coverage areas may be configured to provide wireless broadband services such as wideband code division multiple access (WCDMA) and long-term evolution (LTE), as examples.

In some cases, multiple WDS coverage areas provided inside buildings may overlap with coverage areas of the BTS in the conventional cellular network. As such, RF interferences may occur between the WDS and the conventional cellular network. As a result, capacity, throughput, and coverage of the WDS and the conventional cellular network can both be severely degraded.

It may be possible to map out RF bands and/or channels employed by the WDS and the conventional cellular network during initial deployment of the WDS to avoid the RF interferences between the WDS and the conventional cellular network. However, it is difficult to anticipate all possible RF spectrum allocation and utilization during the initial deployment of the WDS. For example, new communications services, new RF spectrums, new WDS coverage areas, and/or new BTSs may be added at a later time.

No admission is made that any reference cited herein constitutes prior art. Applicant expressly reserves the right to challenge the accuracy and pertinency of any cited documents.

SUMMARY

Embodiments of the disclosure relate to optimizing performance between a wireless distribution system (WDS) and a macro network(s). In this regard, in one example, a macro network optimization system is provided in a macro network. The macro network optimization system is configured to detect and improve performance between a WDS and a macro network, such as a cellular network, for example. In one exemplary aspect, the macro network optimization system analyzes a WDS performance report provided by the WDS to detect a performance indicator indicative of performance between the WDS and the macro network. For example, the detected performance indicator may be based on detected RF interference between the WDS and the macro network. The macro network optimization system is configured to reconfigure operations of one or more macro network elements to optimize performance between the WDS and the macro network based on the detected performance indicator(s) between the WDS and the macro network. In another exemplary aspect, the macro network optimization system analyzes a macro network performance report provided by the macro network and the WDS performance report provided by the WDS to detect and optimize performance between the WDS and the macro network. By detecting and optimizing performance between the WDS and the macro network, it is possible to improve capacity, throughput, and coverage of the performance interaction WDS and the macro network, thus providing better quality of experience (QoE) to end users.

One embodiment of the disclosure relates to a macro network optimization system for optimizing performance in a macro network communicatively coupled to a WDS. The macro network optimization system is configured to receive a WDS performance report from the WDS. The macro network optimization system is also configured to analyze the WDS performance report to determine at least one performance indicator between the WDS and the macro network. The macro network optimization system is also configured to reconfigure one or more macro network elements to optimize the performance between the WDS and the macro network based on the at least one performance indicator determined between the WDS and the macro network.

Another embodiment of the disclosure relates to a method for optimizing performance of a macro network communicatively coupled to a WDS. The method comprises receiving a WDS performance report from the WDS. The method also comprises analyzing the WDS performance report to determine at least one performance indicator between the WDS and the macro network. The method also comprises reconfiguring one or more macro network elements to optimize performance between the WDS and the macro network based on the at least one performance indicator between the WDS and the macro network.

Another embodiment of the disclosure relates to a wireless communications system. The wireless communications system comprises a WDS comprising a central unit coupled to a plurality of remote units over at least one communications medium. The wireless communications system also comprises a performance optimization system communicatively coupled to the central unit and the plurality of remote units. The performance optimization system is configured to generate a WDS performance report. The wireless communications system also comprises a macro network optimization system communicatively coupled to the performance optimization system. The macro network optimization system is configured to receive the WDS performance report from the performance optimization system. The macro network optimization system is also configured to analyze the WDS performance report to determine at least one performance indicator between the WDS and a macro network. The macro network optimization system is also configured to reconfigure one or more macro network elements to optimize performance between the WDS and the macro network based on the at least one performance indicator between the WDS and the macro network.

Another embodiment of the disclosure relates to a performance optimization system for optimizing performance in a WDS communicatively coupled to a macro network. The performance optimization system is configured to receive a macro network performance report from the macro network. The performance optimization system is also configured to analyze the macro network performance report to determine at least one performance indicator between the WDS and the macro network. The performance optimization system is also configured to reconfigure one or more WDS elements to optimize the performance between the WDS and the macro network based on the at least one performance indicator determined between the WDS and the macro network.

Another embodiment of the disclosure relates to a method for optimizing performance of a WDS communicatively coupled to a macro network. The method comprises receiving a macro network performance report from the macro network. The method also comprises analyzing the macro network performance report to determine at least one performance indicator between the WDS and the macro network. The method also comprises reconfiguring one or more WDS elements to optimize performance between the WDS and the macro network based on the at least one performance indicator determined between the WDS and the macro network.

Another embodiment of the disclosure relates to a wireless communications system. The wireless communications system comprises a macro network comprising a macro network optimization system configured to generate a macro network performance report. The wireless communications system also comprises a WDS comprising a central unit coupled to a plurality of remote units over at least one communications medium. The wireless communications system also comprises a performance optimization system communicatively coupled to the central unit and the plurality of remote units. The performance optimization system is configured to receive the macro network performance report from the macro network optimization system. The performance optimization system is also configured to analyze the macro network performance report to determine at least one performance indicator between the WDS and the macro network. The performance optimization system is also configured to reconfigure one or more WDS elements to optimize performance between the WDS and the macro network based on the at least one performance indicator between the WDS and the macro network.

Another embodiment of the disclosure relates to a wireless communications system. The wireless communications system comprises a WDS comprising a one or more WDS elements. The wireless communications system also comprises a macro network comprising one or more macro network elements. The wireless communications system also comprises a performance optimization system communicatively coupled to the one or more WDS elements. The performance optimization system is configured to generate a WDS performance report. The performance optimization system is also configured to reconfigure at least one WDS element among the one or more WDS elements in response to receiving one or more WDS reconfiguration instructions. The wireless communications system also comprises a macro network optimization system communicatively coupled to the one or more macro network elements and the performance optimization system. The macro network optimization system is configured to generate a macro network performance report. The macro network optimization system is also configured to reconfigure at least one macro network element among the one or more macro network elements in response to receiving one or more macro network reconfiguration instructions. The wireless communications system also comprises an optimization master communicatively coupled to the performance optimization system and the macro network optimization system. The optimization master is configured to receive the WDS performance report and the macro network performance report from the performance optimization system and the macro network optimization system, respectively. The optimization master is also configured to analyze the WDS performance report and the macro network performance report to determine whether QoEs in the WDS and the macro network meet predefined performance targets. The optimization master is also configured to generate the one or more WDS reconfiguration instructions to reconfigure the at least one WDS element when the optimization master determines that the at least one WDS element needs to be reconfigured to optimize the QoEs in the WDS and the macro network. The optimization master is also configured to generate the one or more macro network reconfiguration instructions to reconfigure the at least one macro network element when the optimization master determines that the at least one macro network element needs to be reconfigured to optimize the QoEs in the WDS and the macro network.

Another embodiment of the disclosure relates to a method for optimizing QoEs in a wireless communications system comprising a macro network and a WDS. The method comprises generating a WDS performance report. The method also comprises reconfiguring at least one WDS element among one or more WDS elements in response to receiving one or more WDS reconfiguration instructions. The method also comprises generating a macro network performance report. The method also comprises reconfiguring at least one macro network element among one or more macro network elements in response to receiving one or more macro network reconfiguration instructions. The method also comprises analyzing the WDS performance report and the macro network performance report to determine whether QoEs in the WDS and the macro network meet predefined performance targets. The method also comprises generating the one or more WDS reconfiguration instructions to reconfigure the at least one WDS element among the one or more WDS elements in response to determining that the at least one WDS element needs to be reconfigured to optimize the QoEs in the WDS and the macro network. The method also comprises generating the one or more macro network reconfiguration instructions to reconfigure the at least one macro network element among the one or more macro network elements in response to determining that the at least one macro network element needs to be reconfigured to optimize the QoEs in the WDS and the macro network.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiments and, together with the description, serve to explain principles and operation of the various embodiments.

BRIEF DESCRIPTION OF THE DRAWINGS

FIG. 5 is a table providing an exemplary summary of WDS performance data included in the WDS performance report of FIG. 3;

FIG. 12 is a table providing an exemplary summary of the WDS performance data provided in the table of FIG. 5, as well as macro network performance data included in a macro network performance report;

DETAILED DESCRIPTION

Embodiments of the disclosure relate to optimizing performance between a wireless distribution system (WDS) and a macro network(s). In this regard, in one example, a macro network optimization system is provided in a macro network. The macro network optimization system is configured to detect and improve performance between a WDS and a macro network, such as a cellular network, for example. In one exemplary aspect, the macro network optimization system analyzes a WDS performance report provided by the WDS to detect a performance indicator indicative of performance between the WDS and the macro network. For example, the detected performance indicator may be based on detected RF interference between the WDS and the macro network. The macro network optimization system is configured to reconfigure operations of one or more macro network elements to optimize performance between the WDS and the macro network based on the detected performance indicator(s) between the WDS and the macro network. In another exemplary aspect, the macro network optimization system analyzes a macro network performance report provided by the macro network and the WDS performance report provided by the WDS to detect and optimize performance between the WDS and the macro network. By detecting and optimizing performance between the WDS and the macro network, it is possible to improve capacity, throughput, and coverage of the performance interaction WDS and the macro network, thus providing better quality of experience (QoE) to end users.

Before discussing examples of optimizing performance between a WDS and a macro network below starting at FIG. 3, discussion of an exemplary WDS that employs a communications medium to support wireless communications services to a plurality of remote units is first discussed with reference to FIG. 1. An overview of performance scenarios in the form of detected RF interferences between a remote unit in the exemplary WDS and a base transceiver station (BTS) in a macro network are provided with references to FIGS. 2A and 2B. The discussion of specific exemplary aspects of optimizing between a WDS and a macro network starts at FIG. 3.

Figure 1:
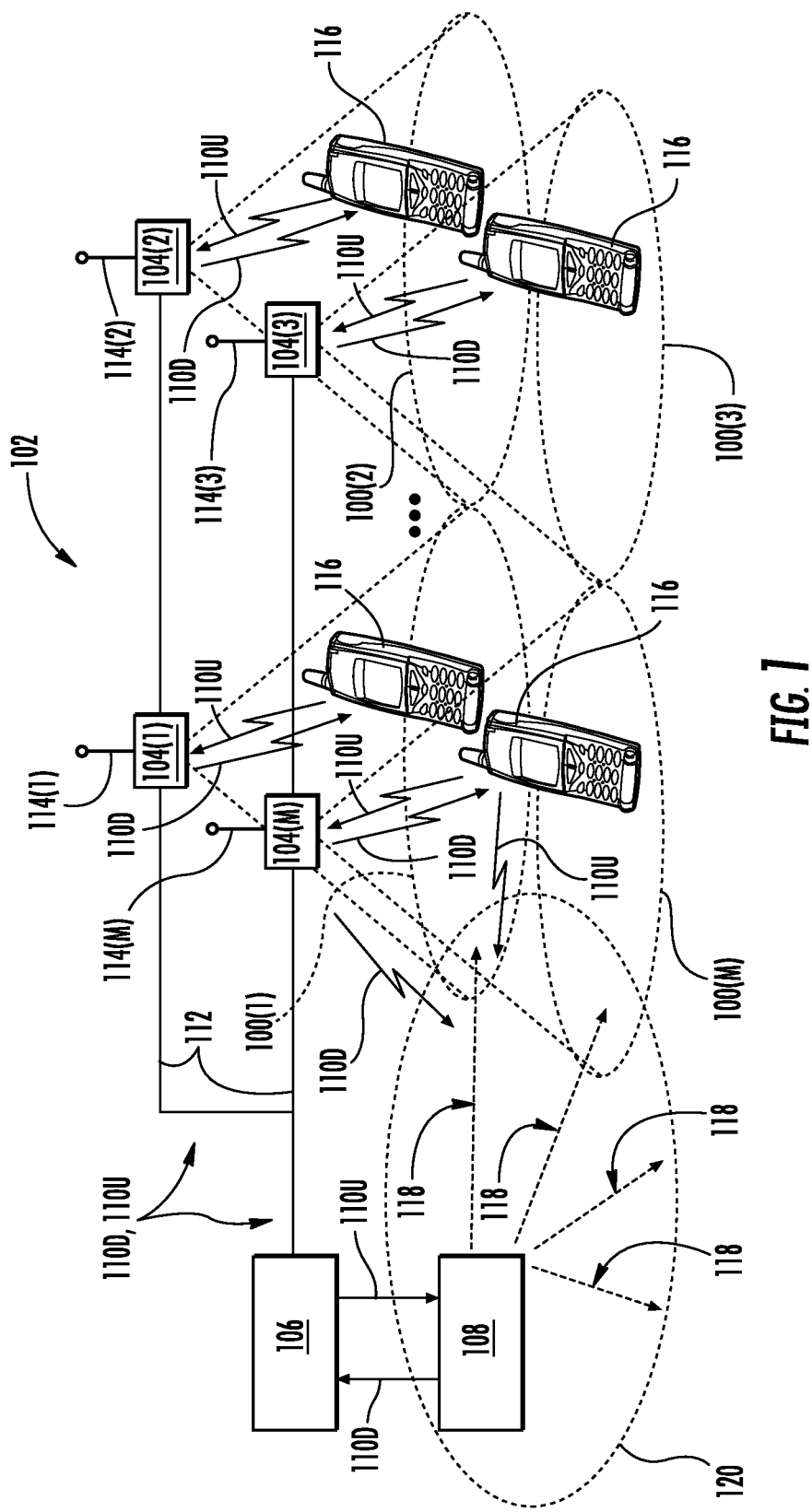
FIG. 1 is a schematic diagram of an exemplary wireless distribution system (WDS) provided in the form of a distributed antenna system (DAS)

In this regard, FIG. 1 illustrates a distribution of communications services to remote unit coverage areas 100(1)-100(M) of a WDS 102, wherein 'M' is the number of remote unit coverage areas. In a non-limiting example, the WDS 102 is also provided in the form of a distributed antenna system (DAS). These communications services can include cellular services such as long-term evolution (LTE), wireless services such as Wireless Fidelity (Wi-Fi) and BLUETOOTH™, and combinations thereof, as examples. The remote unit coverage areas 100(1)-100(M) may be remotely located. In this regard, each of the remote unit coverage areas 100(1)-100(M) is created by and centered on one or more remote units 104(1)-104(M) connected to a central unit 106 (e.g., a head-end controller or head-end unit). In a non-limiting example, the one or more remote units 104(1)-104(M) are also provided in the form of one or more remote antenna units (RAUs), and the remote unit coverage areas 100(1)-100(M) are also provided in the form of RAU coverage areas.

With continuing reference to FIG. 1, the central unit 106 may be communicatively coupled to a signal source 108, for example, a BTS or a baseband unit (BBU). In this regard, the central unit 106 receives downlink communications signals 110D, which may comprise downlink communications signals from a variety of communications services, from the signal source 108 to be distributed to the one or more remote units 104(1)-104(M) in each of the remote unit coverage areas 100(1)-100(M). Each of the one or more remote units 104(1)-104(M) is configured to receive the downlink communications signals 110D from the central unit 106 over a communications medium 112 to be distributed to the respective remote unit coverage areas 100(1)-100(M) of the one or more remote units 104(1)-104(M). In a non-limiting example, the communications medium 112 may be a wired communications medium, a wireless communications medium, or an optical fiber-based communications medium. Each of the one or more remote units 104(1)-104(M) in each of the remote unit coverage areas 100(1)-100(M) may include an RF transmitter/receiver (not shown) and a respective antenna 114(1)-114(M) operably connected to the RF transmitter/receiver to wirelessly distribute the communications services to client devices 116 within the respective remote unit coverage areas 100(1)-100(M).

The one or more remote units 104(1)-104(M) are also configured to receive uplink communications signals 110U, which may comprise uplink communications signals corresponding to the variety of communications services, from the client devices 116 within the respective remote unit coverage areas 100(1)-100(M) to be distributed to the signal source 108. The size of each of the remote unit coverage areas 100(1)-100(M) is determined by the amount of RF power transmitted by the one or more respective remote units 104(1)-104(M), receiver sensitivity, antenna gain, and RF environment, as well as by RF transmitter/receiver sensitivity of the client devices 116. The client devices 116 usually have a fixed maximum RF receiver sensitivity so that the above-mentioned properties of the one or more remote units 104(1)-104(M) mainly determine the size of each of the respective remote unit coverage areas 100(1)-100(M).

With continuing reference to FIG. 1, the signal source 108 transmits macro network communications signals 118 in a macro network coverage area 120. The macro network coverage area 120 may overlap with one or more of the remote unit coverage areas 100(1)-100(M) in the WDS 102, as shown in FIG. 1. For example, when the macro network coverage area 120 overlaps with the remote unit coverage area 100(M), the remote unit 104(M) and/or the client device 116 in the remote unit coverage area 100(M) of the WDS 102 may receive the macro network communications signals 118 transmitted from the signal source 108 in the macro network coverage area 120. Likewise, the signal source 108 may receive the downlink communications signals 110D transmitted by the remote unit 104(M) in the remote unit coverage area 100(M) of the WDS 102. As such, the macro network communications signals 118 may interfere with the downlink communications signals 110D and/or the uplink communications signals 110U that are communicated in the one or more of the remote unit coverage areas 100(1)-100(M) overlapping with the macro network coverage area 120. In this regard, FIG. 2A is an exemplary illustration of downlink RF interferences between a remote unit coverage area 200 in a WDS 202 and a macro network coverage area 204 in a macro network 206 that overlap with one another.

Figure 2A:
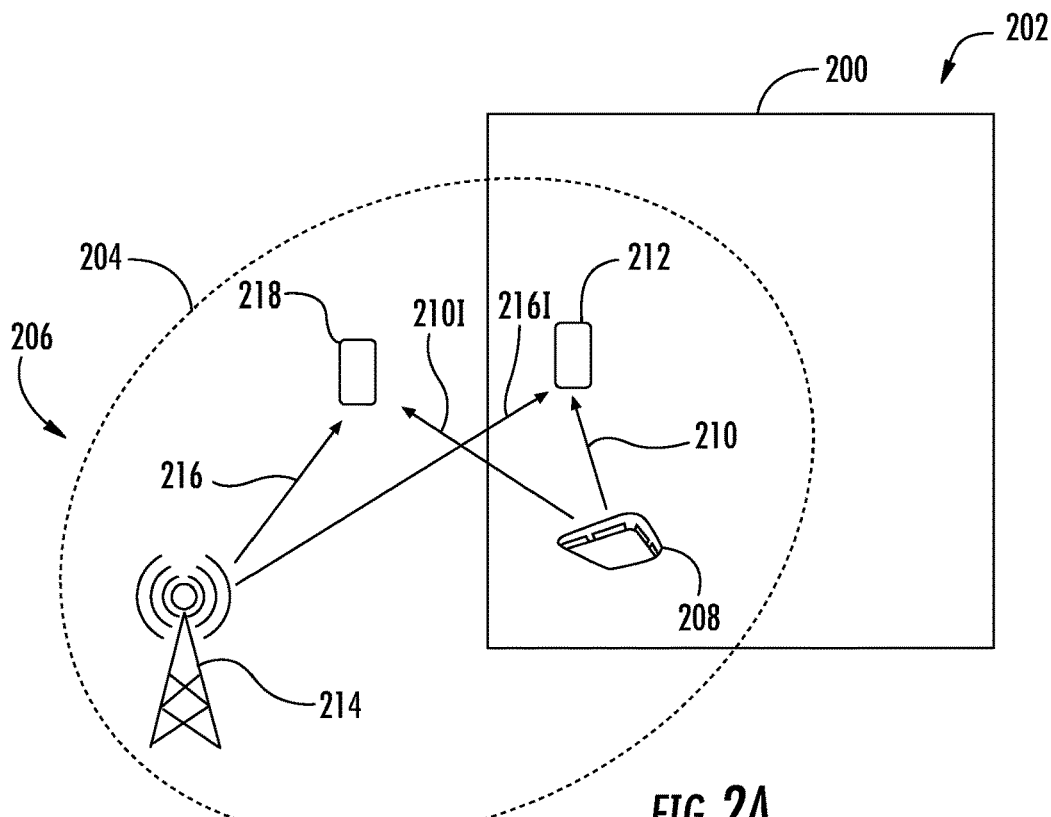
FIG. 2A is an exemplary illustration of downlink radio frequency (RF) interferences between a remote unit coverage area in a WDS and a macro network coverage area in a macro network that overlap with one another.

With reference to FIG. 2A, a remote unit 208 transmits downlink communications signals 210 to an indoor client device 212 in the remote unit coverage area 200. An outdoor base station 214 communicates macro network downlink communications signals 216 to an outdoor client device 218 located in the macro network coverage area 204. Because the remote unit coverage area 200 overlaps with the macro network coverage area 204, the outdoor client device 218 may receive the downlink communications signals 210 as WDS downlink interference signals 210I. Likewise, the indoor client device 212 may also receive the macro network downlink communications signals 216 as macro network downlink interference signals 216I. If the downlink communications signals 210 and the macro network downlink communications signals 216 are transmitted in adjacent or overlapping RF channels, RF interferences, such as adjacent-channel interference and co-channel interference, may occur. Consequently, as an example, the macro network downlink interference signals 216I may cause an RF receiver in the indoor client device 212 to become saturated or blocked and, thus, unable to receive the downlink communications signals 210. Likewise, the WDS downlink interference signals 210I may cause an RF receiver in the outdoor client device 218 to become saturated or blocked and, thus, unable to receive the macro network downlink communications signals 216.

Figure 2B:
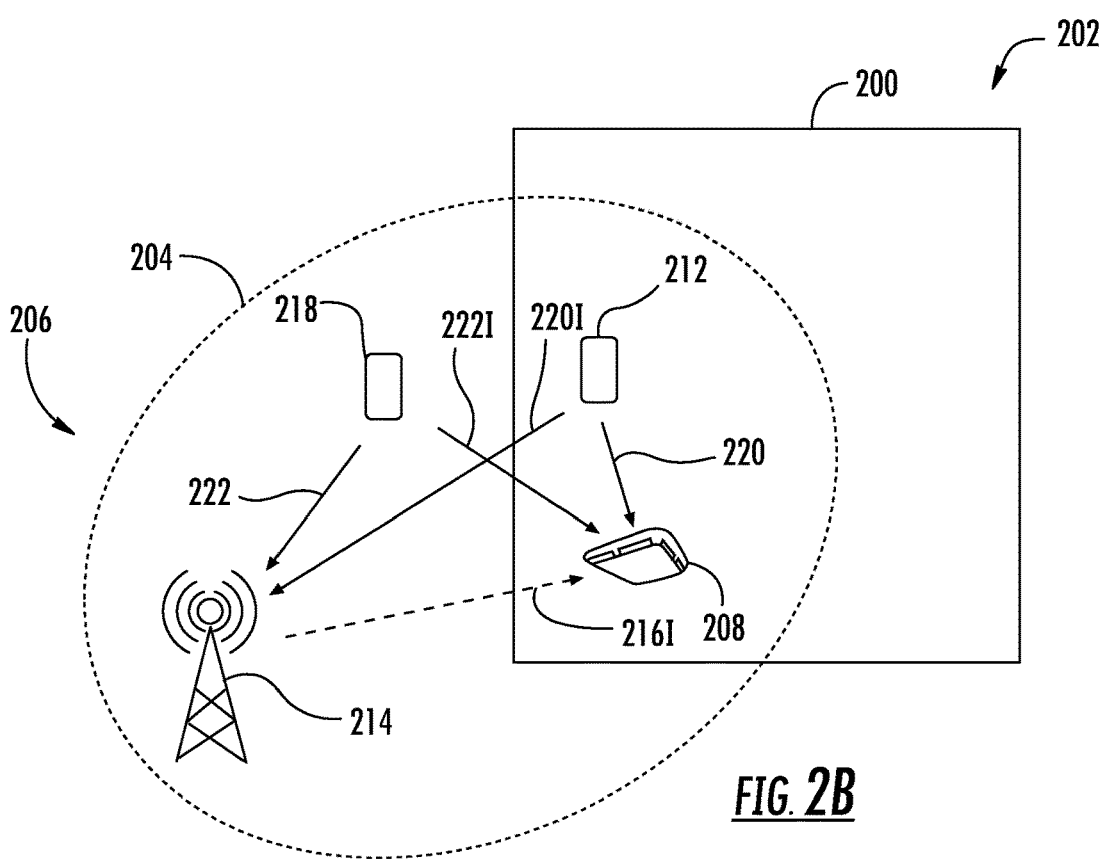
FIG. 2B is an exemplary illustration of uplink RF interferences between the remote unit coverage area and the macro network coverage area of FIG. 2A.

Similar RF interferences may also occur among uplink communications signals. In this regard, FIG. 2B is an exemplary illustration of uplink RF interferences between the remote unit coverage area 200 of the WDS 202 and the macro network coverage area 204 of the macro network 206 in FIG. 2A. The indoor client device 212 transmits uplink communications signals 220 to the remote unit 208 in the remote unit coverage area 200. The outdoor client device 218 communicates macro network uplink communications signals 222 to the outdoor base station 214 in the macro network coverage area 204. Because the remote unit coverage area 200 overlaps with the macro network coverage area 204, the outdoor base station 214 may receive the uplink communications signals 220 transmitted by the indoor client device 212 as WDS uplink interference signals 220I.

Likewise, the remote unit 208 may also receive the macro network uplink communications signals 222 transmitted by the outdoor client device 218 as macro network uplink interference signals 222I. Furthermore, the remote unit 208 may also receive the macro network downlink communications signals 216 transmitted by the outdoor base station 214 as the macro network downlink interference signals 216I. If the uplink communications signals 220, the macro network uplink communications signals 222, and the macro network downlink communications signals 216 are transmitted in adjacent or overlapping RF channels, RF interferences, such as adjacent-channel interference and co-channel interference, may occur. Consequently, as an example, the WDS uplink interference signals 220I may cause an RF receiver in the outdoor base station 214 to become saturated or blocked and, thus, unable to receive the macro network uplink communications signals 222. Likewise, the macro network uplink interference signals 222I and the macro network downlink interference signals 216I may cause an RF receiver of the remote unit 208 to become saturated or blocked and, thus, unable to receive the uplink communications signals 220.

As discussed in FIGS. 2A and 2B, the RF interference that exists between the remote unit coverage area 200 and the macro network coverage area 204 may be experienced by the remote unit 208, the indoor client device 212, the outdoor base station 214, and the outdoor client device 218. It may be desired to reduce these RF interferences in the WDS 202 and the macro network 206 even though it may not be possible to avoid overlap between the remote unit coverage area 200 and the macro network coverage area 204.

Figure 3:
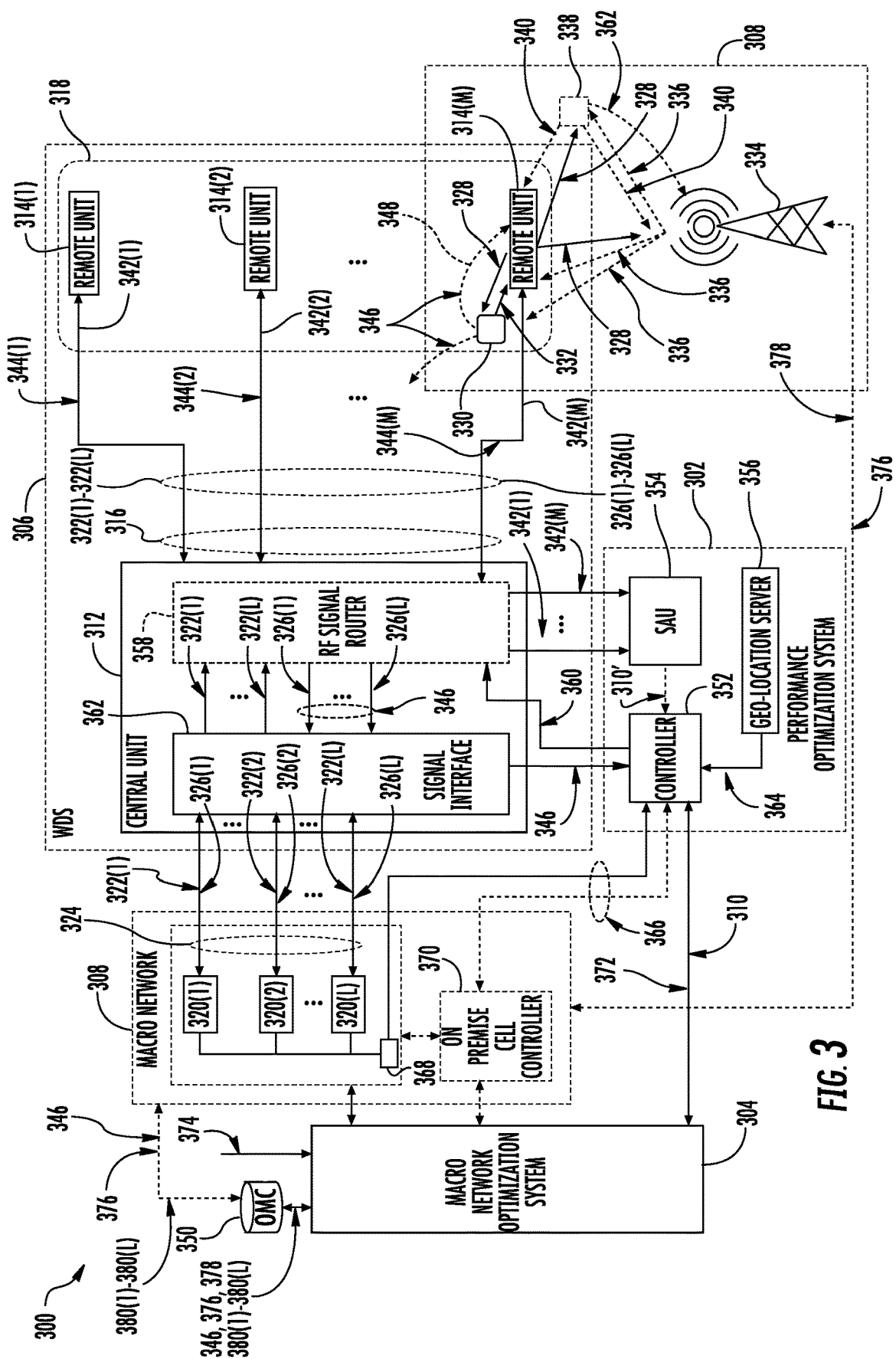
FIG. 3 is a schematic diagram of an exemplary wireless communications system in which a performance optimization system and a macro network optimization system are employed to detect a performance indicator(s) indicating of performance between a WDS and a macro network and optimize performance between a WDS and a macro network based on a WDS performance report provided by the performance optimization system.

In this regard, FIG. 3 is a schematic diagram of an exemplary wireless communications system 300 in which a performance optimization system 302 and a macro network optimization system 304 are employed to optimize performance between a WDS 306 and a macro network 308. In one example, this performance optimization is based on a WDS performance report 310 provided by the performance optimization system 302. For example, the performance optimization may be based on determining RF interference between a WDS 306 and a macro network 308 as a performance indicator of performance between a WDS 306 and a macro network 308. As is further discussed later, the RF interferences between the WDS 306 and the macro network 308 may be caused by the WDS downlink interference signals 210I, the macro network downlink interference signals 216I, the WDS uplink interference signals 220I, and/or the macro network uplink interference signals 222I of FIGS. 2A and 2B. The WDS 306 includes a central unit 312 that is coupled to a plurality of remote units 314(1)-314(M) over at least one communications medium 316. In a non-limiting example, the at least one communications medium 316 may be provided as at least one optical fiber-based communications medium. The plurality of remote units 314(1)-314(M) may be deployed in at least one remote unit coverage area 318.

The macro network 308 includes one or more indoor base stations 320(1)-320(L) communicatively coupled to the central unit 312. The central unit 312 receives one or more downlink communications signals 322(1)-322(L) from the one or more indoor base stations 320(1)-320(L), respectively. In a non-limiting example, the one or more indoor base stations 320(1)-320(L) may be located in outdoors and coupled to the central unit 312 via a cloud based radio access network (RAN) architecture. The one or more downlink communications signals 322(1)-322(L) correspond to an RF channel set 324 that may comprise multiple downlink RF channels. In other words, each of the one or more downlink communications signals 322(1)-322 (L) determines a downlink RF channel to be employed for communicating a respective downlink communications signal. The central unit 312 provides the one or more downlink communications signals 322(1)-322(L) to the plurality of remote units 314(1)-314(M) over the communications medium 316. In this regard, each of the plurality of remote units 314(1)-314 (M) is configured to operate on at least one downlink RF channel determined by at least one downlink communications signal being provided to the respective remote unit. The central unit 312 also receives one or more uplink communications signals 326(1)-326(L) from the plurality of remote units 314(1)-314(M) over the communications medium 316 and provides the one or more uplink communications signals 326(1)-326(L) to the one or more indoor base stations 320(1)-320(L), respectively.

Just as the WDS 202 and the macro network 206 in FIGS. 2A and 2B, the WDS 306 and the macro network 308 may each experience various types and levels of performances, such as RF interferences. For the convenience of reference, the RF interferences originating from the WDS 306 and the RF interferences originating from the macro network 308 are hereinafter referred to as "WDS originated RF interference" and "macro network originated RF interference," respectively. In one non-limiting example, the remote unit 314(M) in the remote unit coverage area 318 may transmit a downlink communications signal 328 to at least one indoor client device 330 and receive an uplink communications signal 332 from the indoor client device 330. In the macro network 308, the one or more indoor base stations 320(1)-

320(L) may transmit the one or more downlink communications signals 322(1)-322(L) and receive the one or more uplink communications signals 326(1)-326(L). In addition, at least one outdoor base station 334, which includes antennas (not shown), in the macro network 308 may transmit a macro network downlink communications signal 336 to at least one outdoor client device 338 in the macro network 308. The outdoor base station 334 may also receive a macro network uplink communications signal 340 transmitted from the outdoor client device 338. The central unit 312, the indoor client device 330, and the plurality of remote units 314(1)-314(M) are generally referred to as "WDS elements" hereinafter. The one or more indoor base stations 320(1)-320(L), the outdoor base station 334, and the outdoor client device 338 are generally referred to as "macro network elements" hereinafter. Further, the RF interference between the WDS 306 and the macro network 308 hereinafter refers to the WDS originated RF interference and/or the macro network originated RF interference.

On one hand, the remote unit 314(M) and the indoor client device 330 may both experience macro network originated RF interference caused by the outdoor base station 334, the outdoor client device 338, and/or the one or more indoor base stations 320(1)-320(L). Specifically, the macro network originated RF interference may be caused by the macro network downlink communications signal 336 and/or the macro network uplink communications signal 340, the one or more downlink communications signals 322(1)-322(L), and/or the one or more uplink communications signals 326(1)-326(L). On the other hand, the outdoor base station 334, the outdoor client device 338, and/or the one or more indoor base stations 320(1)-320(L) in the macro network 308 may also be interfered by the WDS originated RF interference. Specifically, the WDS originated RF interference may be caused by the downlink communications signal 328 and/or the uplink communications signal 332. Hence, it is desired to reduce the WDS originated RF interference and the macro network originated RF interference that may exist between the WDS 306 and the macro network 308.

With continuing reference to FIG. 3, to be able to reduce the RF interferences between the WDS 306 and the macro network 308, it is necessary to first detect existence of the RF interferences between the WDS 306 and the macro network 308. In this regard, the macro network optimization system 304 analyzes the WDS performance report 310 to determine the types and levels of RF interferences that may exist between the WDS 306 and the macro network 308. As further described later in FIG. 5, the WDS performance report 310 may include a performance indicator(s) in the form of RF signal information collected by the plurality of remote units 314(1)-314(M), a QoE report produced by the indoor client device 330, and/or a WDS cell trace data gathered in the WDS 306. In this regard, the macro network optimization system 304 analyzes one or more performance indicators contained in the WDS performance report 310 to determine the performance between the WDS 306 and the macro network 308. For example, a performance indicator may be types and/or levels of RF interferences that exist between the WDS 306 and the macro network 308 as an example. In this example, if the RF interference is determined to exist between the WDS 306 and the macro network 308, the macro network optimization system 304 can then reconfigure the operations of one or more macro network elements (not shown) in the macro network 308 to reduce the RF interference between the WDS 306 and the macro network 308. By detecting the performance between the WDS 306 and the macro network 308, it is possible to provide performance optimizations in the WDS 306 and the macro network 308. In addition, by optimizing performance between the WDS 306 and the macro network 308, it is also possible to provide handover and capacity optimizations in the WDS 306 and the macro network 308.

Figure 4:
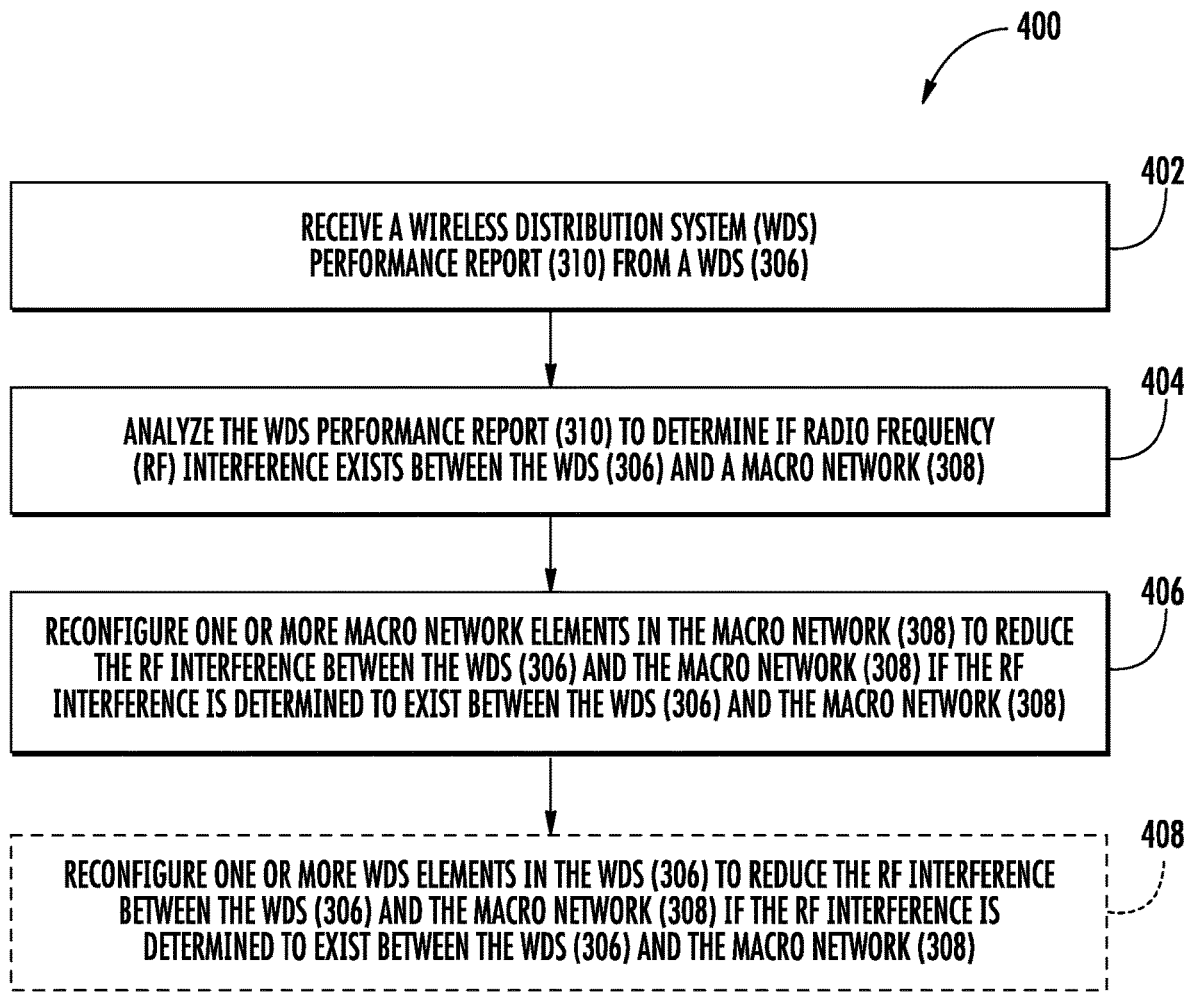
FIG. 4 is a flowchart illustrating an exemplary performance optimization process that can be performed by the macro network optimization system of FIG. 3 for determining and optimizing performance between the WDS and the macro network based on the WDS performance report provided by the performance optimization system.

FIG. 4 is a flowchart illustrating an exemplary performance optimization process 400 that can be performed by the macro network optimization system 304 of FIG. 3 for determining and reducing the RF interferences between the WDS 306 and the macro network 308 based on the WDS performance report 310 provided by the performance optimization system 302, as one example of determining performance indicators regarding the performance between the WDS 306 and the macro network 308 and optimizing performance between the WDS 306 and the macro network 308.

In this regard, with reference to FIG. 4, the macro network optimization system 304 receives the WDS performance report 310 from the performance optimization system 302 in the WDS 306 (block 402). The macro network optimization system 304 analyzes the WDS performance report 310 to determine the performance between the WDS 306 and the macro network 308 (block 404). In this example, the determined performance indicator is RF interference existing between the WDS 306 and the macro network 308. The macro network optimization system 304 reconfigures one or more macro network elements in the macro network 308 to optimize the performance between the WDS 306 and the macro network 308 if the RF interference is determined to exist between the WDS 306 and the macro network 308 (block 406). In addition, the macro network optimization system 304 may also reconfigure one or more WDS elements in the WDS 306 to optimize the performance between the WDS 306 and the macro network 308 if the RF interference is determined to exist between the WDS 306 and the macro network 308 (block 408).

With continuing reference to FIG. 3, the plurality of remote units 314(1)-314(M) in the WDS 306 is configured to provide a plurality of WDS performance measurements 342(1)-342(M), respectively, to the central unit 312. The plurality of WDS performance measurements 342(1)-342(M) may include a plurality of RF signal information 344(1)-344 (M), respectively. Each of the plurality of RF signal information 344(1)-344(M) includes one or more RF signals sniffed by a respective remote unit among the plurality of remote units 314(1)-314(M).

For the convenience of reference and discussion, the remote unit 314(M) in the remote unit coverage area 318, the indoor client device 330, the outdoor base station 334, and the outdoor client device 338 are referenced hereinafter as non-limiting examples. It shall be appreciated that the configurations and operation principles discussed hereinafter are applicable to all of the WDS elements and all of the macro network elements.

With continuing reference to FIG. 3, for example, an RF receiver in the remote unit 314(M) may sniff the uplink communications signal 332 transmitted from the indoor client device 330, the macro network downlink communications signal 336 transmitted by the outdoor base station 334, the macro network uplink communications signal 340 transmitted by the outdoor client device 338, the one or more downlink communications signals 322(1)-322 (L) received from the one or more indoor base stations 320(1)-320(L) and transmitted by other remote units among the plurality of remote units 314(1)-314(M), and the one or more uplink communications signals 326(1)-326(L) provided to the one or more indoor base stations 320(1)-320(L). As such, the remote unit 314(M) may measure and report these sniffed RF signals in the RF signal information 344(M). In this regard, the one or more RF signals contained in each of the plurality of RF signal information 344(1)-344(M) may include both downlink RF signals and uplink RF signals sniffed by each of the plurality of remote units 314(1)-314(M), respectively.

With continuing reference to FIG. 3, in a non-limiting example, the indoor client device 330 may provide a QoE report 346 to the remote unit 314(M), which may be the remote unit closest to the indoor client device 330, for example, via an alternative communications link 348. The alternative communications link 348 may be a Bluetooth® communications link or a Wi-Fi communications link, for example. As such, the remote unit 314(M) may include the QoE report 346 received from the indoor client device 330 in the WDS performance measurement 342(M) provided by the remote unit 314(M) to the central unit 312. The central unit 312 may in turn provide the QoE report 346 to the performance optimization system 302. Furthermore, the central unit 312 may also provide the QoE report 346 to an operation and maintenance center (OMC) 350 in the macro network 308 via the one or more indoor base stations 320(1)-320(L).

With continuing reference to FIG. 3, the performance optimization system 302 includes a controller 352, a signal analysis unit (SAU) 354, and a geo-location server 356. In a non-limiting example, the geo-location server 356 can be provided in the macro network 308. The SAU 354 is communicatively coupled to the controller 352. The performance optimization system 302 may be communicatively coupled to the central unit 312. The central unit 312 may include a signal router 358 coupled to the communications medium 316 and the SAU 354. In this regard, the SAU 354 may receive the plurality of WDS performance measurements 342(1)-342 (M) from the plurality of remote units 314(1)-314(M), respectively, through the signal router 358. However, it may also be possible that the SAU 354 receives the plurality of WDS performance measurements 342(1)-342(M) from the plurality of remote units 314(1)-314(M), respectively, without going through the signal router 358. In a non-limiting example, the signal router 358 may provide the plurality of WDS performance measurements 342(1)-342(M) to the SAU 354 in response to receiving a control signal 360 from the controller 352.

The central unit 312 also includes a signal interface 362 that is communicatively coupled to the one or more indoor base stations 320(1)-320(L) and the signal router 358. In one non-limiting example, the signal interface 362 may receive the plurality of WDS performance measurements 342(1)-342(M) from the signal router 358. The signal interface 362 may be configured to provide the plurality of WDS performance measurements 342(1)-342 (M) to the one or more indoor base stations 320(1)-320(L) in the one or more uplink communications signals 326(1)-326(L). In another non-limiting example, the signal interface 362 may receive the QoE report 346 contained in the WDS performance measurement 342(M) and subsequently provide the QoE report 346 to the indoor base station 320(L).

With continuing reference to FIG. 3, the geo-location server 356 may determine a location of the indoor client device 330 that generates the QoE report 346. As such, the geo-location server 356 may provide the geo-location data 364 about the indoor client device 330 that generated the QoE report 346. The geo-location data 364 determined by the geo-location server 356 allows the macro network optimization system 304 to take surrounding environmental factors (e.g., building structure, building materials, building height, etc.) into consideration when reconfiguring the operations of one or more macro network elements to optimize performance (e.g., reduce the RF interference) between the WDS 306 and the macro network 308. In this regard, the SAU 354 generates a partial WDS performance report 310' that includes the plurality of WDS performance measurements 342(1)-342(M) received from the plurality of remote units 314(1)-314(M) and the QoE report 346 provided by the indoor client device 330. The SAU 354 provides the partial WDS performance report 310' to the controller 352. In addition to receiving the partial WDS performance report 310', the controller 352 may also be able to gather a cell trace data 366 from the WDS 306 (also referred to herein as "WDS cell trace data 366"). In a non-limiting example, the controller 352 may retrieve the cell trace data 366 from an X2 and cell trace data sniffer 368 and/or an on premise cell controller 370. The controller 352 may include the cell trace data 366, the partial WDS performance report 310' received from the SAU 354, and the geo-location data 364 provided by the geo-location server 356 in the WDS performance report 310 and provide the WDS performance report 310 to the macro network optimization system 304. As such, the macro network optimization system 304 can analyze the WDS performance report 310 to determine the performance indicator(s) (e.g., the RF interferences that may exist) regarding the performance between the WDS 306 and the macro network 308.

In this regard, FIG. 5 is a table 500 providing an exemplary summary of WDS performance data included in the WDS performance report 310 of FIG. 3. The table 500 includes a report source column 502, a report type column 504, a description column 506, and a data collected by column 508. The table 500 includes a first row 510 that includes the plurality of RF signal information 344(1)-344(M) provided by the plurality of remote units 314(1)-314(M) in the WDS 306 of FIG. 3. The report source column 502 indicates that the plurality of RF signal information 344(1)-344(M) is generated in the WDS 306. The report type column 504 indicates that the plurality of RF signal information 344(1)-344(M) is included in the WDS performance report 310, as discussed earlier in FIG. 3. The description column 506 indicates that the plurality of RF signal information 344(1)-344(M) each includes such information as frequency, power, physical cell ID (PCI), global cell ID (GCI), etc., of the macro network downlink communications signal 336 and the one or more downlink communications signals 322(1)-322(L). The data collected by column 508 indicates that the plurality of RF signal information 344(1)-344(M) is collected by the SAU 354 based on the plurality of RF signal information 344(1)-344(M) received from the plurality of remote units 314(1)-314(M).

Figure 6A:
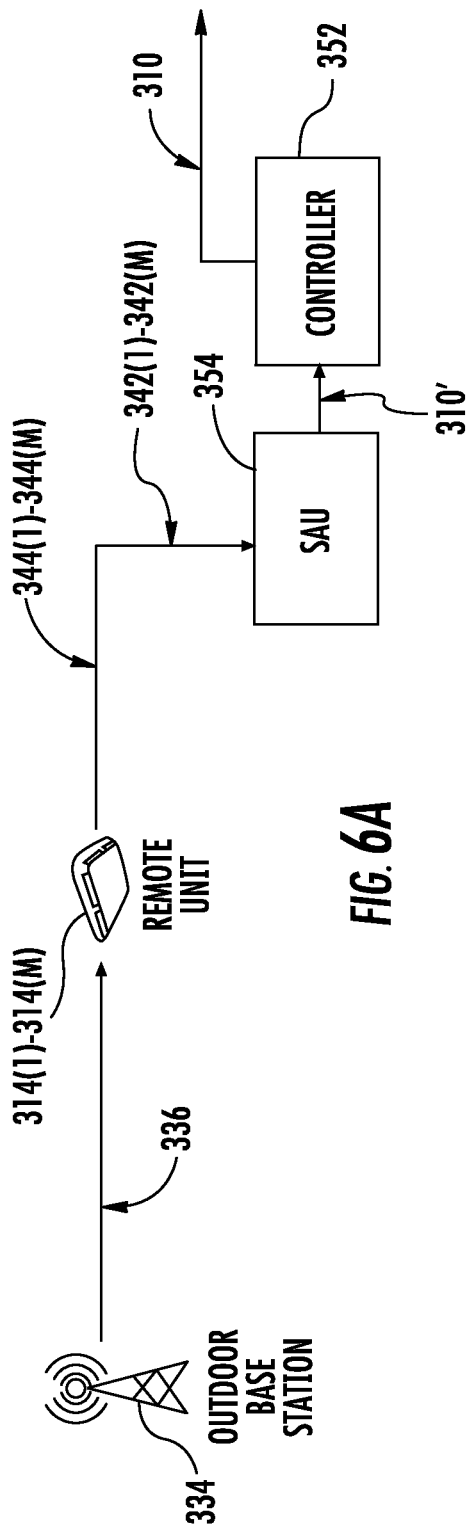
FIG. 6A is an exemplary schematic diagram of a plurality of remote units in the WDS of FIG. 3 configured to collect a plurality of RF signal information that contains information summarized in the table of FIG. 5.

In this regard, FIG. 6A is an exemplary schematic diagram of the plurality of remote units 314(1)-314(M) in the WDS 306 of FIG. 3 configured to collect the plurality of RF signal information 344(1)-344(M) that contains the information summarized in the first row 510 of the table 500 in FIG. 5. Common elements between FIGS. 3 and 6A are shown therein with common element numbers and will not be re-described herein.

With reference to FIG. 6A, in a non-limiting example, the plurality of remote units 314(1)-314(M) may collect the plurality of RF signal information 344(1)-344(M) by sniffing and measuring the macro network downlink communications signal 336 transmitted by the outdoor base station 334. In addition, the plurality of remote units 314(1)-314(M) may sniff and measure the one or more downlink communications signals 322(1)-322(L) (not shown) transmitted from the one or more indoor base stations 320(1)-320(L) (not shown). The plurality of remote units 314(1)-314(M) provides the plurality of RF signal information 344(1)-344 (M) to the SAU 354 in the plurality of WDS performance measurements 342(1)-342(M). The SAU 354 in turn includes the plurality of RF signal information 344(1)-344(M) in the partial WDS performance report 310' and provides the partial WDS performance report 310' to the controller 352. The controller 352 in turn includes the plurality of RF signal information 344(1)-344(M) as part of the WDS performance report 310.

With reference back to FIG. 5, the table 500 includes a second row 512, which includes information provided by the indoor client device 330 in the QoE report 346. The report source column 502 indicates that the QoE report 346 is generated in the WDS 306. The report type column 504 indicates that the QoE report 346 is included in the WDS performance report 310, as discussed earlier in FIG. 3. The description column 506 indicates the content of the QoE report 346, which may include such information as received signal level, signal to noise ratio (SNR), signal to interference and noise ratio (SINR), cell identification (ID) of camped/serving cells as well as neighboring cells, modulation and coding scheme (MCS), location of the indoor client device 330, etc. In addition, in a non-limiting example, the QoE report 346 may also include such information as received signal strength indicator (RSSI), reference signal received power (RSRP), and reference signal received quality (RSRQ). The data collected by column 508 indicates that the QoE report 346 is obtained by the indoor client device 330 in the WDS 306 and provided to the remote unit 314(M) that is closest to the indoor client device 330 via the alternative communications link 348. The geo-location server 356 may provide the geo-location data 364 about the indoor client device 330 (e.g., as a location of the remote unit 314(M)) in the WDS 306.

Figure 6B:
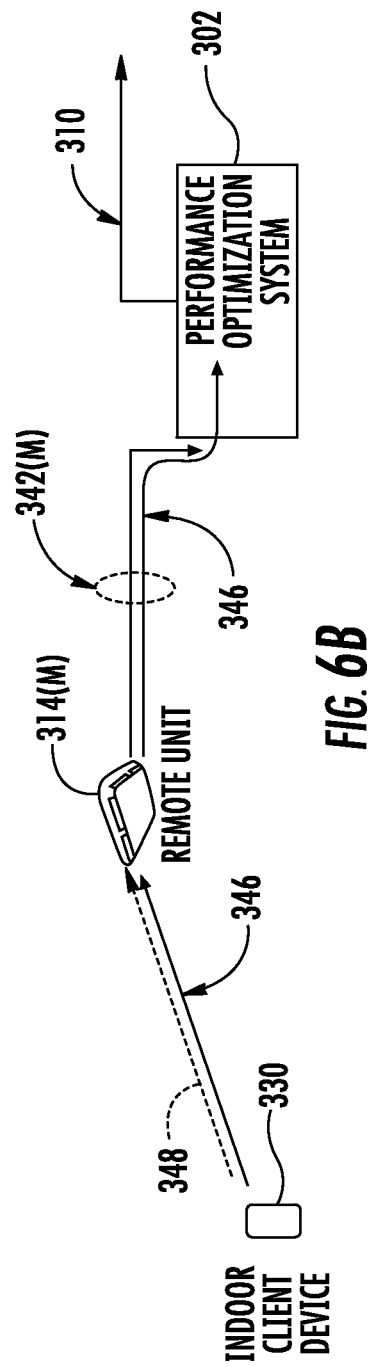
FIG. 6B is an exemplary schematic diagram of an indoor client device in the WDS of FIG. 3 configured to generate a quality of experience (QoE) report that contains information summarized in a second row of the table in FIG. 5.

In this regard, FIG. 6B is an exemplary schematic diagram of the indoor client device 330 in the WDS 306 of FIG. 3 configured to generate the QoE report 346 that contains the information summarized in the second row 512 of the table 500 in FIG. 5. Common elements between FIGS. 3 and 6B are shown therein with common element numbers and will not be re-described herein.

With reference to FIG. 6B, in a non-limiting example, the indoor client device 330 may generate the QoE report 346 by measuring the downlink communications signal 328 transmitted by the remote unit 314(M), the macro network downlink communications signal 336 transmitted by the outdoor base station 334, the one or more downlink communications signals 322(1)-322(L) transmitted from the one or more indoor base stations 320(1)-320(L), the macro network uplink communications signal 340 transmitted by the outdoor client device 338, and/or the one or more uplink communications signals 326(1)-326(L) transmitted to the one or more indoor base stations 320(1)-320(L) (shown in FIG. 3). The indoor client device 330 provides the QoE report 346 to the remote unit 314(M), which may be the closest remote unit to the indoor client device 330, via the alternative communications link 348. The remote unit 314(M) provides the QoE report 346 to the central unit 312 (not shown) in the WDS performance measurement 342(M). The central unit 312 in turn provides the QoE report 346 to the performance optimization system 302. The controller 352 (not shown) in the performance optimization system 302 includes the QoE report 346 as part of the WDS performance report 310.

With reference back to FIG. 5, the table 500 includes a third row 514, which includes information provided by the indoor client device 330 in the QoE report 346. The report source column 502 indicates that the QoE report 346 is generated in the WDS 306. The report type column 504 indicates that the QoE report 346 is included in the WDS performance report 310, as discussed earlier in FIG. 3. The description column 506 indicates the QoE report 346 is provided by the indoor client device 330 to the one or more indoor base stations 320(1)-320(L). The content of the QoE report 346 includes such information as received signal level, SNR/SINR, cell ID of camped/serving cells as well as neighboring cells, MCS, etc. In addition, in a non-limiting example, the QoE report 346 may also include such information as RSSI, RSRP, and RSRQ. The data collected by column 508 indicates that the controller 352 may retrieve the QoE report 346 based on the cell trace data 366. The geo-location server 356 may provide a location of the indoor client device 330 in the WDS 306.

Figure 6C:
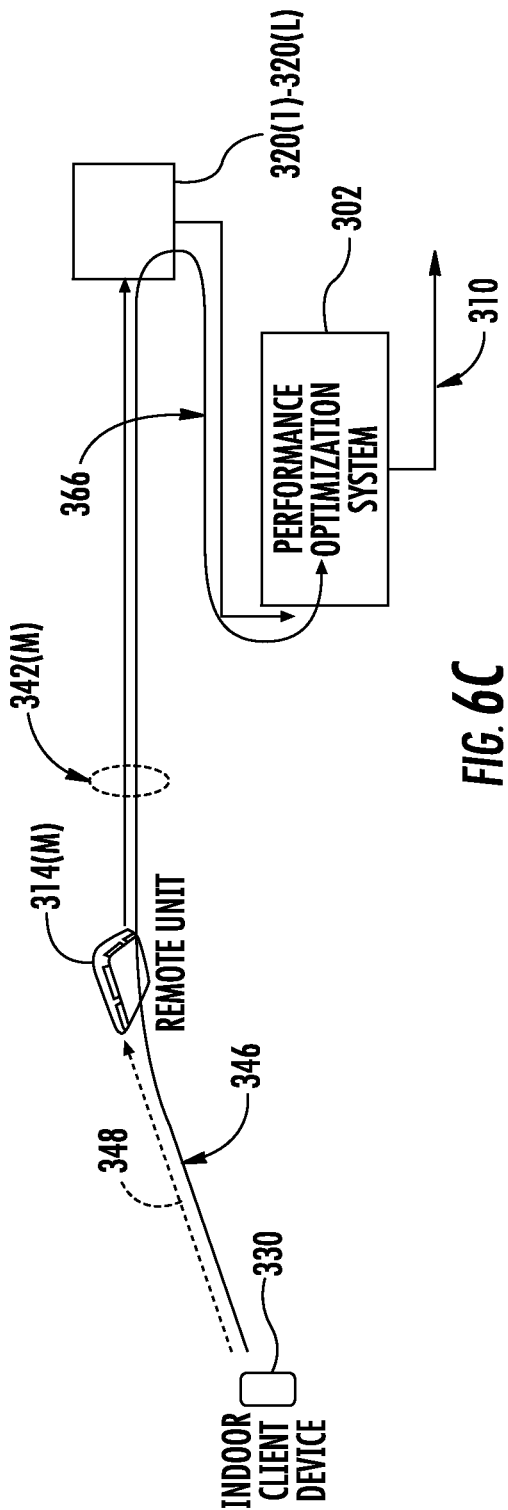
FIG. 6C is an exemplary schematic diagram of an indoor client device in the WDS of FIG. 3 configured to generate a QoE report that contains information summarized in a third row of the table in FIG. 5.

In this regard, FIG. 6C is an exemplary schematic diagram of the indoor client device 330 in the WDS 306 of FIG. 3 configured to generate the QoE report 346 that contains the information summarized in the third row 514 of the table 500 in FIG. 5. Common elements between FIGS. 3 and 6C are shown therein with common element numbers and will not be re-described herein.

With reference to FIG. 6C, in a non-limiting example, the indoor client device 330 may generate the QoE report 346 by measuring the downlink communications signal 328 transmitted by the remote unit 314(M), the macro network downlink communications signal 336 transmitted by the outdoor base station 334, the one or more downlink communications signals 322(1)-322(L) transmitted from the one or more indoor base stations 320(1)-320(L), the macro network uplink communications signal 340 transmitted by the outdoor client device 338, and/or the one or more uplink communications signals 326(1)-326(L) transmitted to the one or more indoor base stations 320(1)-320(L) (shown in FIG. 3). The indoor client device 330 provides the QoE report 346 to the remote unit 314(M), which may be a nearby remote unit to the indoor client device 330, via the alternative communications link 348. The remote unit 314(M) provides the QoE report 346 to the central unit 312 (not shown) in the WDS performance measurement 342(M). The central unit 312 in turn provides the QoE report 346 to any of the one or more indoor base stations 320(1)-320(L). The controller 352 (not shown) in the performance optimization system 302 may retrieve the QoE report 346 via the WDS cell trace data 366 and include the QoE report 346 as part of the WDS performance report 310.

Figure 7:
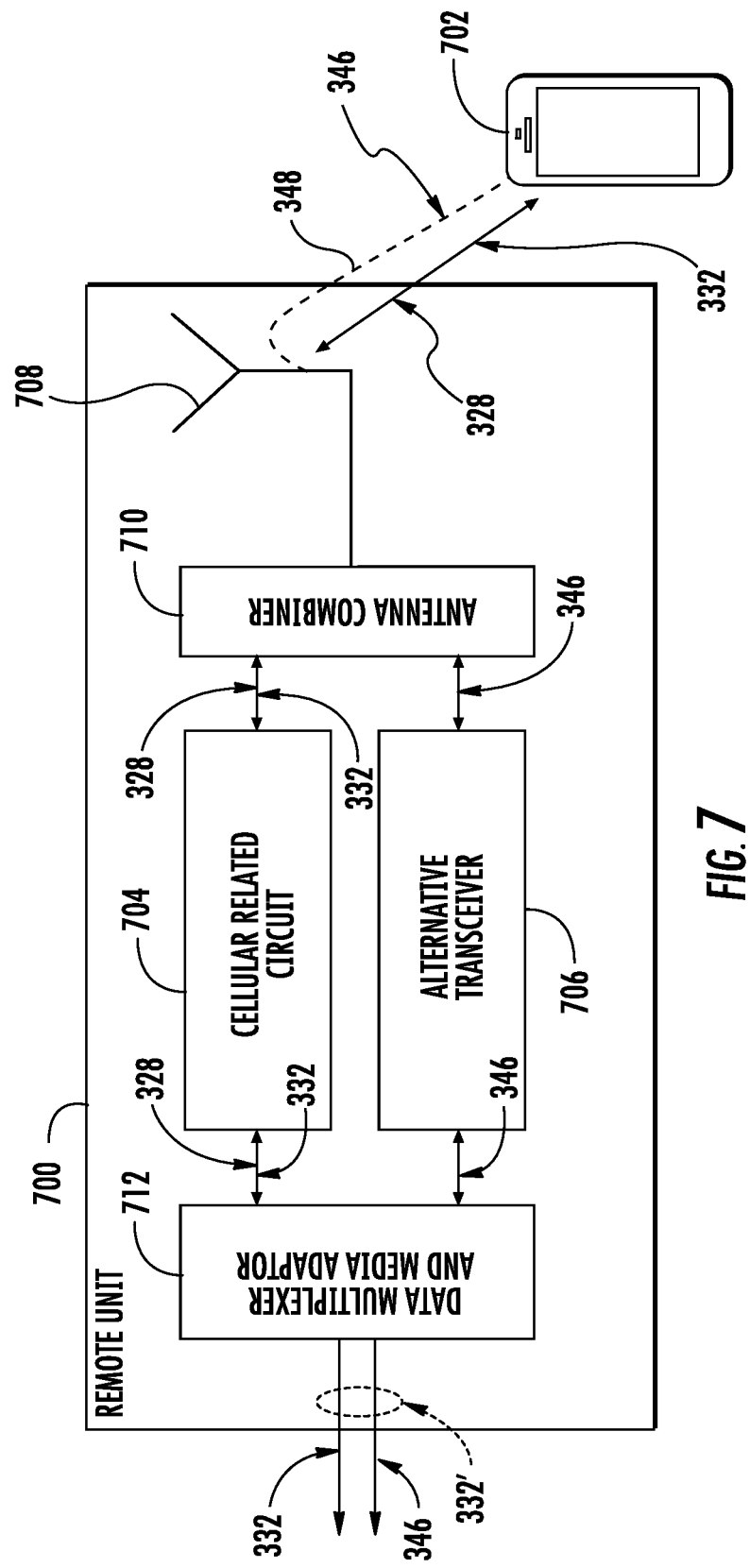
FIG. 7 is a schematic diagram of an exemplary remote unit configured to receive a QoE report from a client device over an alternative communications link.

As previously discussed in FIG. 3, the indoor client device 330 may communicate the QoE report 346 to the remote unit 314(M) via the alternative communications link 348. In this regard, FIG. 7 is a schematic diagram of an exemplary remote unit 700, which may be any of the plurality of remote units 314(1)-314(M) in the WDS 306, configured to receive the QoE report 346 of FIG. 3 from a client device 702, which may be the indoor client device 330, over the alternative communications link 348. Common elements between FIGS. 3 and 7 are shown therein with common element numbers and will not be re-described herein.

With reference to FIG. 7, the remote unit 700 includes a cellular related circuit 704 and an alternative transceiver 706. The cellular related circuit 704 and the alternative transceiver 706 are coupled to at least one antenna 708 via an antenna combiner 710. The cellular related circuit 704 may be coupled to the antenna 708 to transmit the downlink communications signal 328 to the client device 702 and receive the uplink communications signal 332 from the client device 702. The alternative transceiver 706 may be coupled to the antenna 708 to receive the QoE report 346 over the alternative communications link 348. In one non-limiting example, the alternative communications link 348 is a Bluetooth® communications link. In another non-limiting example, the alternative communications link 348 is a Wi-Fi communications link. The remote unit 700 also comprises a data multiplexer and media adaptor 712. The data multiplexer and media adaptor 712 multiplexes the QoE report 346 with the uplink communications signal 332 to generate an uplink communications signal 332', which may be any of the one or more uplink communications signals 326(1)-326 (L), for transmission to the central unit 312 (not shown) over the communications medium 316 (not shown). In this regard, the QoE report 346 and the uplink communications signal 332 are separated from each other without being combined into a single signal.

Figure 8:
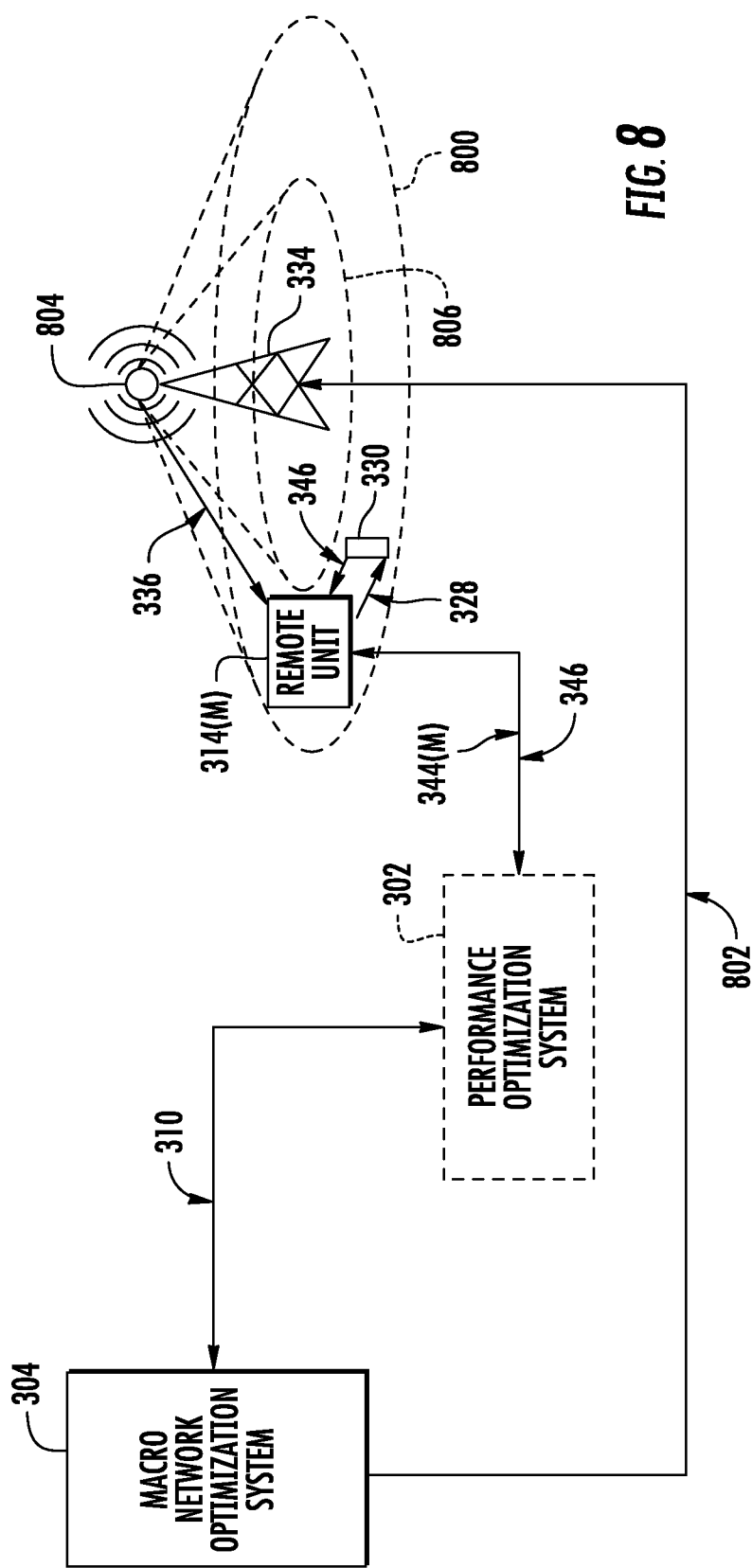
FIG. 8 is a schematic diagram providing an exemplary illustration of the macro network optimization system of FIG. 3 reconfiguring an outdoor base station in response to receiving the WDS performance report indicating that the outdoor base station is interfering with an indoor client device in the WDS.

With reference back to FIG. 3, upon determining a performance indicator(s) indicative of performance (e.g., RF interference exists) between the WDS 306 and the macro network 308, the macro network optimization system 304 may reconfigure one or more macro network elements, such as the outdoor base station 334 for example, to optimize performance (e.g., reduce the macro network originated RF interference) between the WDS 306 and the macro network 308. In this regard, FIG. 8 is a schematic diagram providing an exemplary illustration of the macro network optimization system 304 of FIG. 3 reconfiguring the outdoor base station 334 in response to receiving the WDS performance report 310 indicating that the outdoor base station 334 is interfering with the indoor client device 330 in the WDS 306 (not shown). Common elements between FIGS. 3 and 8 are shown therein with common element numbers and will not be re-described herein.

With reference to FIG. 8, the outdoor base station 334 may be configured to cover a coverage area 800 that overlaps with the indoor client device 330, for example. As such, the indoor client device 330 may experience RF interference from the macro network downlink communications signal 336 transmitted by the outdoor base station 334. The indoor client device 330 is thus able to sniff the macro network downlink communications signal 336 and report QoE data to SAU 354 (not shown) in the performance optimization system 302 in the QoE report 346. The performance optimization system 302 in turn includes the QoE report 346 in the WDS performance report 310 provided to the macro network optimization system 304.

In this example, in response to receiving the WDS performance report 310 indicating that the outdoor base station 334 is causing RF interference with the indoor client device 330 in the WDS 306, the macro network optimization system 304 may reconfigure the outdoor base station 334 to reduce the RF interference on the indoor client device 330 in the WDS 306 to optimize the performance between the WDS 306 and the macro network 308. In a first non-limiting example, the macro network optimization system 304 may provide a reconfiguration signal 802 to the outdoor base station 334 to reconfigure at least one antenna 804 in the outdoor base station 334. For example, the indoor client device 330 may reside on a floor with higher elevation. As such, the macro network optimization system 304 may change the radiation pattern and/or propagation direction of the antenna 804 by adjusting electrical tilt and/or mechanical tilt of the antenna 804. On one hand, the antenna 804 may include a plurality of antenna elements (not shown) and the electrical tilt may be obtained by adjusting respective phases of the RF signals (e.g., the macro network downlink communications signal 336) transmitted by the plurality of antenna elements. On the other hand, the mechanical tilt may be obtained by tilting the antenna 804 downward to change the propagation direction of the macro network downlink communications signal 336. The mechanical tilt may be achieved through specific accessories (e.g., an electrical motor) of the antenna 804 or by manual adjustment by a technician. In a second non-limiting example, the reconfiguration signal 802 may also reduce transmit power of the antenna 804. In a third non-limiting example, the macro network optimization system 304 can cause the outdoor base station 334 to transmit at a different RF channel or band to reduce the RF interference on the indoor client device 330 in the WDS 306 to optimize the performance between the WDS 306 and the macro network 308. As a result of antenna, power, and/or frequency adjustment, the outdoor base station 334 may cover a reduced coverage area 806 that does not overlap with the indoor client device 330, thus helping reduce or eliminate the RF interference caused by the macro network downlink communications signal 336 in this example.

With continuing reference to FIG. 8, the macro network optimization system 304 may reconfigure the outdoor base station 334 in multiple phases to avoid unnecessary adjustment. For example, the macro network optimization system 304 may make an initial adjustment and then monitor the QoE report 346 in the WDS performance report 310 for a predetermined monitoring period before making subsequent adjustments. In addition, the macro network optimization system 304 may also monitor performances of the macro network 308 to ensure that performance of the outdoor base station 334 is not negatively impacted by the adjustment (e.g., antenna tilt). In a non-limiting example, the predefined monitoring period may range from seconds to days. In addition, the macro network optimization system 304 may also reconfigure the outdoor base station 334 to transmit in an alternative RF channel to reduce the determined RF interference between the WDS 306 and the macro network 308.

With continuing reference to FIG. 8, it may be possible that the coverage area 800 overlaps with the remote unit 314(M). As such, the remote unit 314(M) may experience RF interference from the macro network downlink communications signal 336 transmitted by the outdoor base station 334. The remote unit 314(M) is thus able to sniff the macro network downlink communications signal 336 and report sniffed RF signal to the performance optimization system 302 in the RF signal information 344(M). The performance optimization system 302 in turn includes the RF signal information 344(M) in the WDS performance report 310 provided to the macro network optimization system 304. In response to receiving the WDS performance report 310 indicating that the outdoor base station 334 is causing RF interference with the remote unit 314(M) in the WDS 306, the macro network optimization system 304 may reconfigure the outdoor base station 334 to reduce the RF interference on the remote unit 314(M) in the WDS 306.

As shown in FIG. 3, the SAU 354 is centrally located with the controller 352 and the geo-location server 356. It may also be possible to pair the SAU 354 with each of the plurality of remote units 314(1)-314(M). In this regard, FIG.

9 is a schematic diagram of an exemplary wireless communications system 300' in which a performance optimization system 302' is employed to determine and optimize performance between a WDS 306' and the macro network 308 of FIG. 3 based on a plurality of SAUs 900(1)-900(M) collocated with the plurality of remote units 314(1)-314(M). Common elements between FIGS. 3 and 9 are shown therein with common element numbers and will not be re-described herein.

Figure 9:
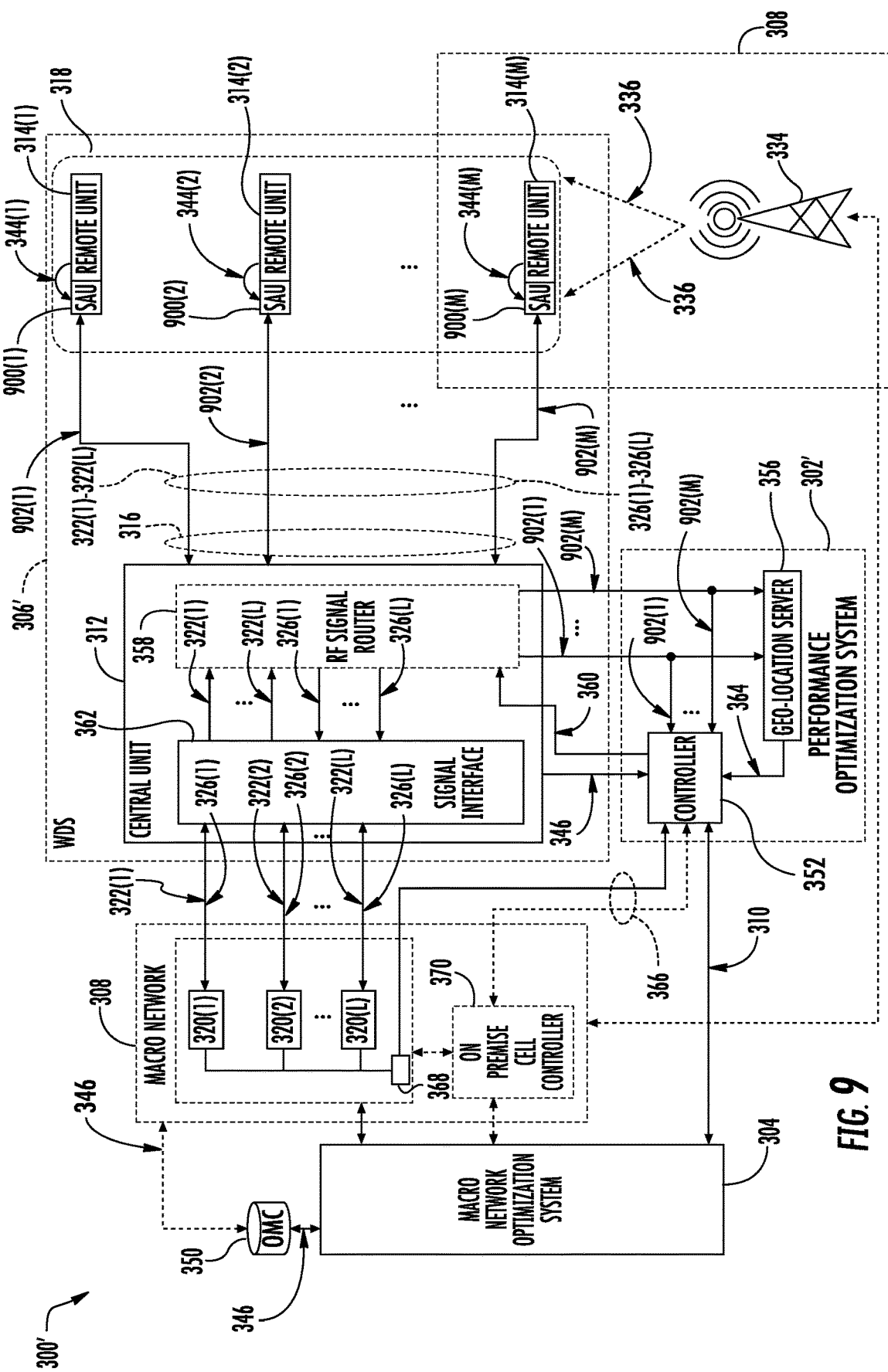
FIG. 9 is a schematic diagram of an exemplary wireless communications system in which an exemplary performance optimization system is employed to optimize performance between a WDS and the macro network of FIG. 3 by determining and reducing RF interferences between the WDS and the macro network based on a plurality of signal analysis units (SAUs) collocated with a plurality of remote units.

With reference to FIG. 9, the plurality of SAUs 900(1)-900(M) receives the plurality of RF signal information 344(1)-344(M) from the plurality of remote units 314(1)-314(M), respectively. The plurality of SAUs 900(1)-900(M) then generates a plurality of WDS performance reports 902(1)-902(M) based on the plurality of RF signal information 344(1)-344(M), respectively. Each of the plurality of WDS performance reports 902(1)-902(M) contains similar information as the WDS performance report 310, but pertains only to a respective remote unit 314 among the plurality of remote units 314(1)-314(M).

In a non-limiting example, the controller 352 receives the plurality of WDS performance reports 902(1)-902(M) from the signal router 358. The controller 352 may then generate the WDS performance report 310 based on information contained in the plurality of WDS performance reports 902(1)-902(M) and provide the WDS performance report 310 to the macro network optimization system 304.

Figure 10:
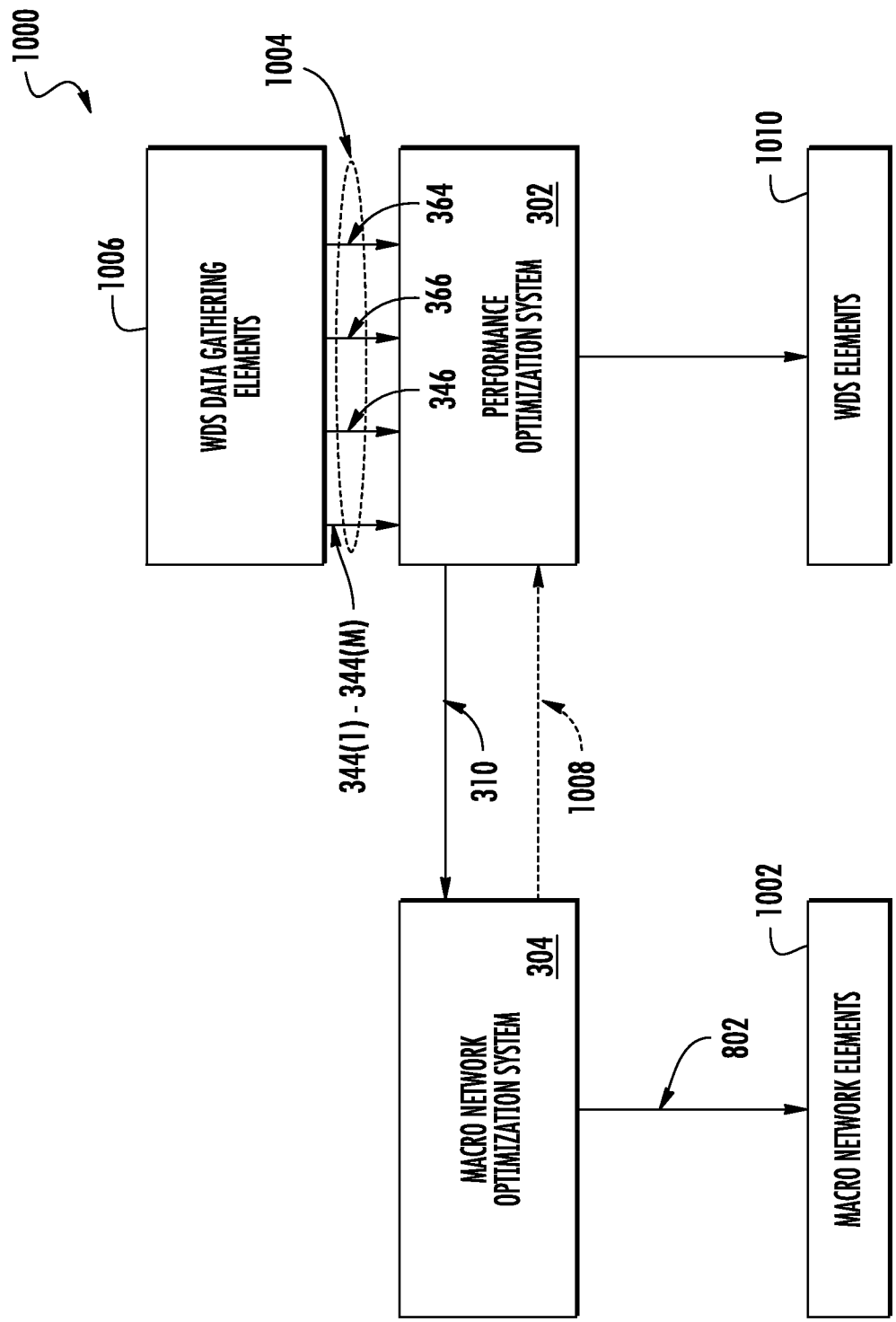
FIG. 10 is a block diagram providing an exemplary summary of the macro network optimization system of FIG. 3 that reconfigures macro network elements based on the WDS performance report and according to aspects discussed in FIGS. 3-9.

As previously discussed in FIG. 3, upon determining interference performance indicator(s) indicative of performance between the WDS 306 and the macro network 308 based on the WDS performance report 310 can be optimized (e.g. RF interference between the WDS 306 and the macro network 308 exists), the macro network optimization system 304 may reconfigure one or more macro network elements to optimize the performance (e.g., reduce RF interference) between the WDS 306 and the macro network 308. In this regard, FIG. 10 is a block diagram 1000 providing an exemplary summary of the macro network optimization system 304 of FIG. 3 that reconfigures macro network elements 1002 based on the WDS performance report 310 and according to aspects discussed in FIGS. 3-9. Common elements between FIGS. 3, 8, and 10 are shown therein with common element numbers and will not be re-described herein.

With reference to FIG. 10, the performance optimization system 302 receives WDS data inputs 1004 from WDS data gathering elements 1006. In a non-limiting example, the WDS data gathering elements 1006 may include one or more of the SAU 354, the indoor client device 330, the geo-location server 356, the X2 and cell trace data sniffer 368, and the on premise cell controller 370 of FIG. 3. The WDS data inputs 1004 include the plurality of RF signal information 344(1)-344(M), the QoE report 346, the geo-location data 364, the WDS cell trace data 366, and so on. The performance optimization system 302 generates the WDS performance report 310, which includes the WDS data inputs 1004, and provides the WDS performance report 310 to the macro network optimization system 304.

Upon determining that the performance between the WDS 306 and the macro network 308 can be optimized (e.g., RF interference exists that can be reduced or eliminated) based on the WDS performance report 310, the macro network optimization system 304 reconfigures the macro network elements 1002 to optimize the performance (e.g., reduce RF interference) between the WDS 306 and the macro network 308. As previously discussed, the macro network elements 1002 may include the one or more indoor base stations 320(1)-320(L), the outdoor base station 334, and the outdoor client device 338 of FIG. 3. For example, as discussed in FIG. 8, the macro network optimization system 304 may reconfigure the outdoor base station 334 to reduce transmit power, tilt the antenna 804 in the outdoor base station 334, and/or reconfigure the outdoor base station 334 to change radiation pattern via the reconfiguration signal 802. The macro network optimization system 304 may also reconfigure the outdoor client device 338 to transmit at reduced power and/or transmit in an alternative RF channel. The macro network optimization system 304 may also provide instructions 1008 to instruct the performance optimization system 302 to reconfigure WDS elements 1010. As previously discussed, the WDS elements 1010 include the plurality of remote units 314(1)-314(M), the indoor client device 330, and the central unit 312. In this regard, in one embodiment, the macro network optimization system 304 can instruct the performance optimization system 302 to cause the remote unit 314(M) to transmit at reduced power and/or change radiation pattern. The macro network optimization system 304 can also instruct the performance optimization system 302 to cause the indoor client device 330 to transmit at reduced power and/or transmit in an alternative RF channel. In addition, the performance optimization system 302 can also reconfigure the remote unit 314(M) to transmit in an alternative RF channel. In another embodiment, the macro network optimization system 304 can reconfigure the remote unit 314(M) to transmit at reduced power, change radiation pattern, and/or transmit in an alternative RF channel. The macro network optimization system 304 can also reconfigure the indoor client device 330 to transmit at reduced power and/or transmit in an alternative RF channel.

With reference back to FIG. 3, the macro network optimization system 304 may generate a macro network performance report 372 that includes QoE and other related data generated by the indoor client device 330, the outdoor client device 338, the outdoor base station 334, and/or the one or more indoor base stations 320(1)-320(L). The macro network 308 may process the QoE and other related data reported by the indoor client device 330, the outdoor client device 338, the outdoor base station 334, and the one or more indoor base stations 320(1)-320(L) to generate processed data (e.g., the QoE and related data averaged over a certain period of time). The processed data may than be stored in the OMC 350. In a non-limiting example, the macro network performance report 372 may also include call log and key performance indicator (KPI) information 374 from other entities in the macro network 308.

In a non-limiting example, the outdoor client device 338 may provide a QoE report 376 via the outdoor base station 334 and/or the one or more indoor base stations 320(1)-320 (L). In addition, the outdoor base station 334 may also provide a cell trace data 378 via the macro network 308. The cell trace data 378 may include QoE measurements related to all downlink communications signals that may be received by the outdoor base station 334, including the one or more uplink communications signals 326(1)-326(L) transmitted by the one or more indoor base stations 320(1)-320(L), for example. The cell trace data 378 may also include the QoE report 376 provided by the outdoor client device 338. Further, the one or more indoor base stations 320(1)-320(L) may also provide one or more cell trace data 380(1)-380(L), respectively. The one or more cell trace data 380(1)-380(L) may include the QoE report 346 provided by the indoor client device 330 and/or the QoE report 376 provided by the outdoor client device 338.

In a non-limiting example, the macro network optimization system 304 may retrieve the cell trace data 378 and the one or more cell trace data 380(1)-380(L) from the macro network 308 based on procedures defined in the third generation partnership project (3GPP) technical specification (TS) release 32.421 V9.0.0 (hereinafter referred to as the "3GPP specification"). According to the 3GPP specification, cell trace data, which includes subscriber and equipment trace data, provides very detailed information at call level on one or more specific mobile device(s). This data is an additional source of information to performance measurements and allows going further in monitoring and optimization operations. Contrary to performance measurements, which are a permanent source of information (at the operation and maintenance system (OMS)), trace is activated for a limited period of time for specific analysis purposes. Trace plays a major role in activities such as determination of the root cause of a malfunctioning mobile device, advanced troubleshooting, optimization of resource usage and quality, RF coverage control and capacity improvement, dropped call analysis, core network, and end-to-end mobile telecommunication system procedure validation. The capability to log data on any interface at call level for a specific user (e.g., international mobile station identity (IMSI)) or mobile type (e.g., international mobile equipment identification (IMEI) or international mobile station identity software version (IMEISV)), or service initiated by a user allows getting information which cannot be deduced from performance management data accumulated at the OMS. Performance measurements may include, but are not limited to, perception of end-user quality of service (QOS) during a call (e.g., requested QoS vs. provided QoS), correlation between protocol messages and RF measurements, or interoperability with specific mobile vendors. Moreover, performance management data at the OMS reflects values aggregated on an observation period. Subscriber and user equipment (UE) trace provide instantaneous values for a specific event (e.g., call, location update, etc.). Subscriber and UE trace is the easy way to go deeper into network optimization. In order to produce this data, subscriber and UE trace are carried out in the network equipment (NE), which comprise the network. The data can then be transferred to an external system (e.g., an operating system (OS) in telecommunications management network (TMN) terminology, for further evaluation).

The macro network optimization system 304 may be configured to determine the performance between the WDS 306 and the macro network 308 based on the macro network performance report 372. Accordingly, the macro network optimization system 304 can reconfigure the remote unit 314(M) to transmit at reduced power, change radiation pattern, and/or transmit in an alternative RF channel. The macro network optimization system 304 can also reconfigure the indoor client device 330 to transmit at reduced power and/or transmit in an alternative RF channel.

Accordingly, the macro network optimization system 304 may be further configured to determine the performance between the WDS 306 and the macro network 308 based on both the WDS performance report 310 and the macro network performance report 372. In this regard, FIG. 11 is a flowchart illustrating an exemplary optimization process 1100 that can be performed by the macro network optimization system 304 of FIG. 3 for determining and optimizing performance between the WDS 306 and the macro network 308.

Figure 11:
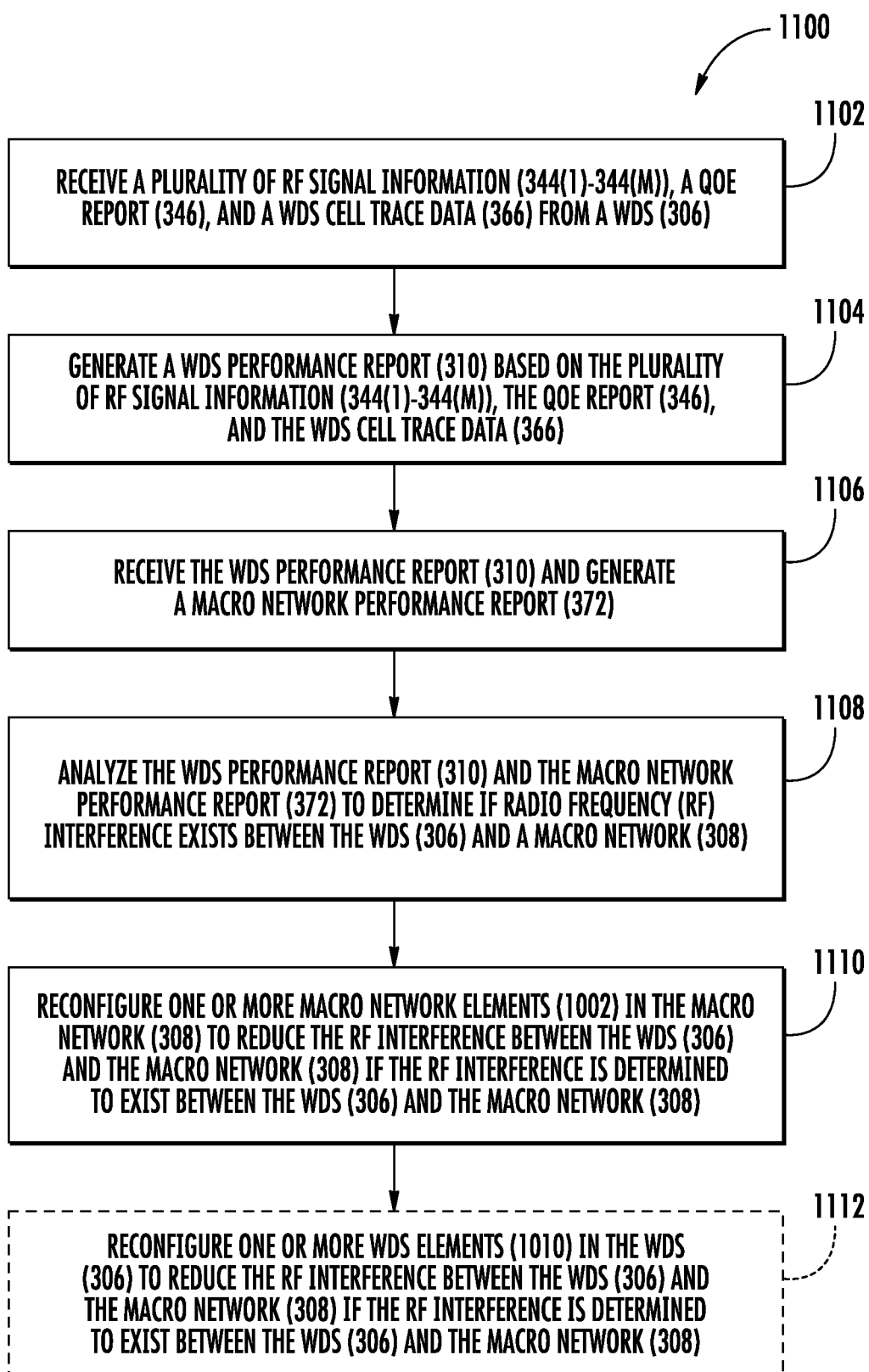
FIG. 11 is a flowchart illustrating an exemplary performance optimization process that can be performed by the macro network optimization system of FIG. 3 by determining and reducing the RF interferences between the WDS and the macro network based on the WDS performance report and a macro network performance report.

With reference to FIG. 11, the performance optimization system 302 receives the plurality of RF signal information 344(1)-344(M), the QoE report 346, and the WDS cell trace data 366 from the WDS 306 (block 1102). The performance optimization system 302 generates the WDS performance report 310 based on the plurality of RF signal information 344(1)-344 (M), the QoE report 346, and the WDS cell trace data 366 (block 1104). The macro network optimization system 304 receives the WDS performance report 310 and generates the macro network performance report 372 (block 1106). The macro network optimization system 304 analyzes the WDS performance report 310 and the macro network performance report 372 to determine the performance (e.g., if RF interference exists) between the WDS 306 and the macro network 308 (block 1108). The macro network optimization system 304 reconfigures the one or more macro network elements 1002 to optimize the performance (e.g., reduce the RF interference) between the WDS 306 and the macro network 308 if the RF interference is determined to exist between the WDS 306 and the macro network 308 (block 1110). The macro network optimization system 304 may also reconfigure the one or more WDS elements 1010 to optimize the performance (e.g., reduce the RF interference) between the WDS 306 and the macro network 308 if it is determined that the performance between the WDS 306 and the macro network 308 (block 1112) may or can be improved.

FIG. 12 is a table 1200 providing an exemplary summary of the WDS performance data provided in the table 500 of FIG. 5, as well as macro network performance data that is included in the macro network performance report 372. Common elements between FIGS. 5 and 12 are shown therein with common element numbers and will not be re-described herein.

The table 1200 includes the first row 510, the second row 512, and the third row 514 of the table 500. The table 1200 includes a fourth row 1202, which includes information provided by the outdoor base station 334 in the cell trace data 378. The report source column 502 indicates that the cell trace data 378 is generated in the macro network 308. The report type column 504 indicates that the cell trace data 378 is included in the macro network performance report 372, as discussed earlier in FIG. 3. The description column 506 indicates that the cell trace data 378 is provided by the outdoor base station 334. The content of the cell trace data 378 may include such information as frequency, power, physical cell ID (PCI), global cell ID (GCI), etc. The data collected by column 508 indicates that the cell trace data 378 is provided by the outdoor base station 334.

Figure 13A:
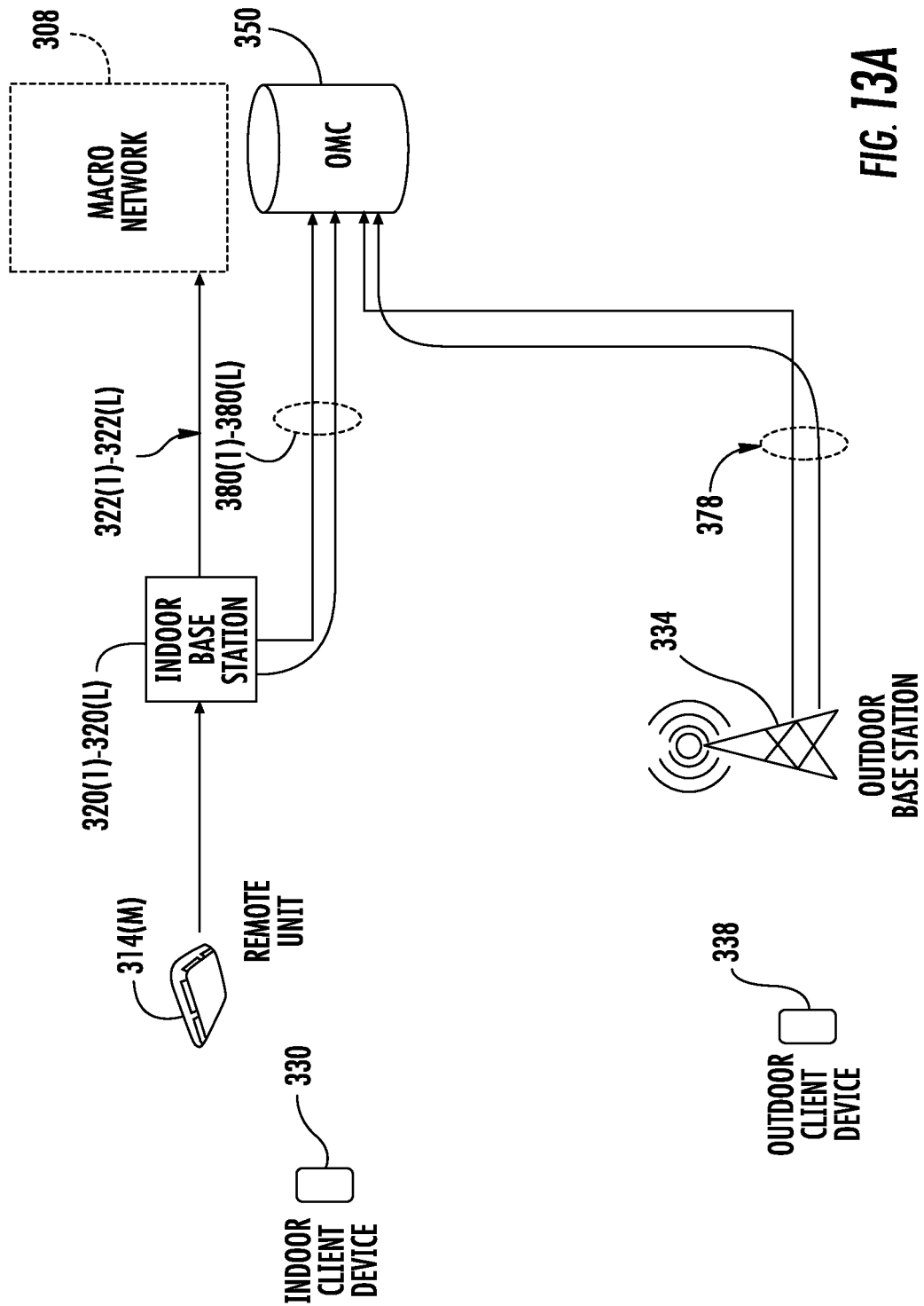
FIG. 13A is an exemplary schematic diagram of an outdoor base station in the macro network of FIG. 3 configured to generate a cell trace data that contains information summarized in a fourth row of the table in FIG. 12.

In this regard, FIG. 13A is an exemplary schematic diagram of the outdoor base station 334 in the macro network 308 of FIG. 3 configured to generate the cell trace data 378 that contains the information summarized in the fourth row 1202 of the table 1200 in FIG. 12. Common elements between FIGS. 3 and 13A are shown therein with common element numbers and will not be re-described herein.

With reference to FIG. 13A, in a non-limiting example, the outdoor base station 334 may generate the cell trace data 378 as a performance indicator by measuring the one or more downlink communications signals 322(1)-322(L) transmitted from the one or more indoor base stations 320(1)-320(L) and the macro network downlink communications signal 336 transmitted by other outdoor base stations in the macro network 308 (shown in FIG. 3). The outdoor base station 334 may process the cell trace data 378 (e.g., average some KPIs for a certain period of time) prior to providing the cell trace data 378 to the OMC 350. Subsequently, the cell trace data 378 may be provided to the performance optimization system 302 in the macro network performance report 372, which may be useful in case the WDS 306 fails to retrieve the cell trace data 378, or may be retrieved by the macro network optimization system 304 from the OMC 350 (shown in FIG. 3).

With reference back to FIG. 12, the table 1200 includes a fifth row 1204, which includes information provided from the indoor client device 330 and the outdoor client device 338 to the OMC 350 via the one or more indoor base stations 320(1)-320(L) and/or the outdoor base station 334. The report source column 502 indicates that the QoE report 346 and the QoE report 376 are generated in the macro network 308. The report type column 504 indicates that the QoE report 346 and the QoE report 376 are included in the macro network performance report 372, as discussed earlier in FIG. 3. The description column 506 indicates the QoE report 346 and the QoE report 376 include such information as received signal level, SNR/SINR, cell ID of camped/serving cells as well as neighboring cells, MCS, locations of the indoor client device 330 and the outdoor client device 338, etc. In addition, in a non-limiting example, the QoE report 346 and the QoE report 376 may also include such information as RSSI, RSRP, and RSRQ. The data collected by column 508 indicates that the QoE report 346 is provided to the OMC 350 by the one or more indoor base stations 320(1)-320(L) in the one or more cell trace data 380(1)-380(L). The report obtained by column 508 also indicates that the QoE report 376 is provided by the outdoor base station 334 via the cell trace data 378 and/or the one or more indoor base stations 320(1)-320(L) in the one or more cell trace data 380(1)-380(L).

Figure 13B:
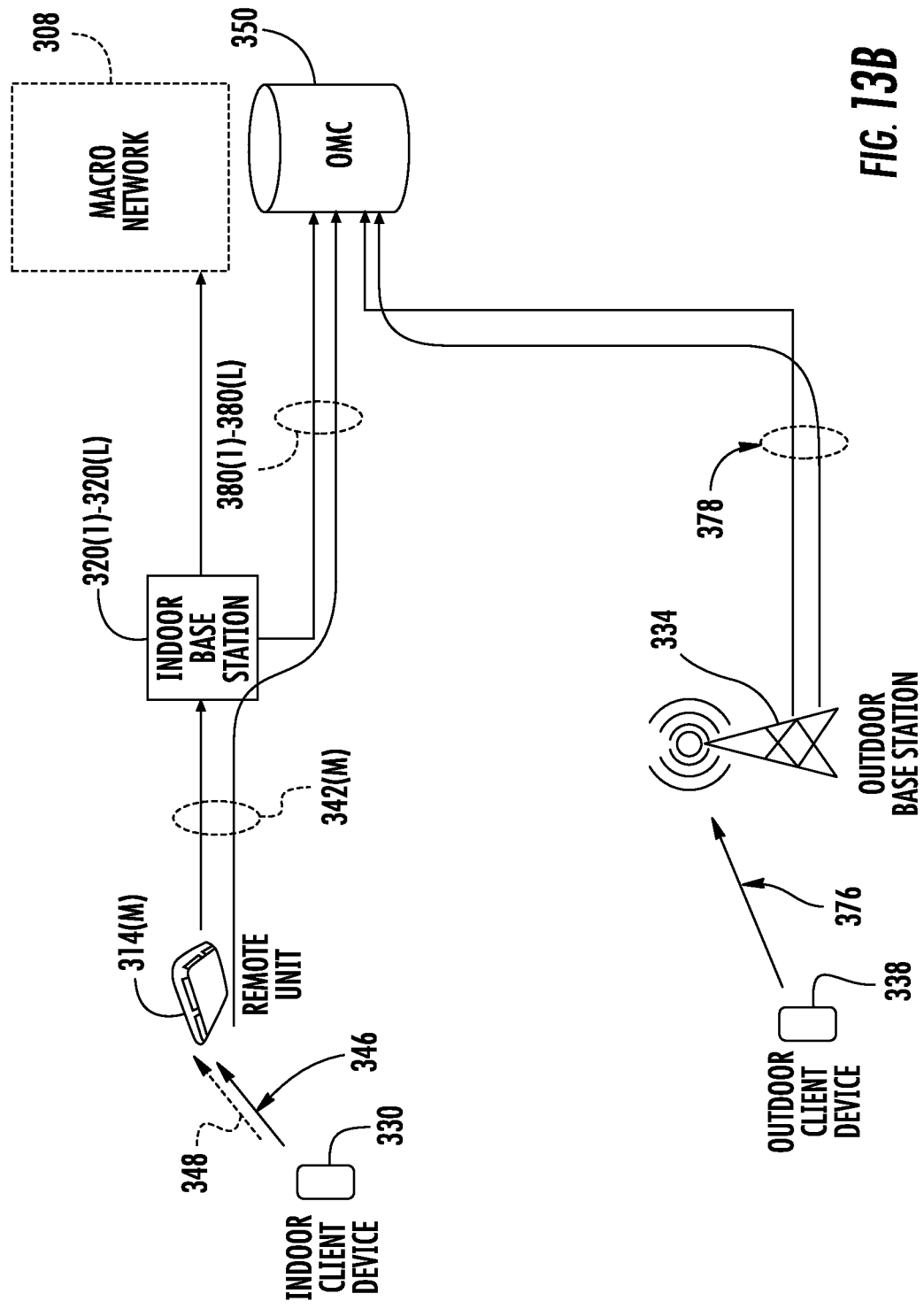
FIG. 13B is an exemplary schematic diagram of an indoor client device in the WDS and an outdoor client device in the macro network of FIG. 3 configured to generate respective QoE reports that contain the information summarized in a fifth row of the table in FIG. 12.

In this regard, FIG. 13B is an exemplary schematic diagram of the indoor client device 330 in the WDS 306 of FIG. 3 and the outdoor client device 338 in the macro network 308 configured to generate the QoE report 346. The QoE report 376 contains the information summarized in the fifth row 1204 of the table 1200 in FIG. 12 in this example. Common elements between FIGS. 3 and 13B are shown therein with common element numbers and will not be re-described herein.

With reference to FIG. 13B, in a non-limiting example, the indoor client device 330 may generate the QoE report 346 by measuring the downlink communications signal 328 transmitted by the remote unit 314(M), the macro network downlink communications signal 336 transmitted by the outdoor base station 334, the one or more downlink communications signals 322(1)-322(L) transmitted from the one or more indoor base stations 320(1)-320(L), the macro network uplink communications signal 340 transmitted by the outdoor client device 338, and/or the one or more uplink communications signals 326(1)-326(L) transmitted to the one or more indoor base stations 320(1)-320(L) (shown in FIG. 3). The indoor client device 330 provides the QoE report 346 to the remote unit 314(M), which may be a nearby remote unit to the indoor client device 330, via the alternative communications link 348. The remote unit 314(M) provides the QoE report 346 to the central unit 312 (not shown) in the WDS performance measurement 342(M). The central unit 312 in turn provides the QoE report 346 to the one or more indoor base stations 320(1)-320(L), which subsequently provide the QoE report 346 to the OMC 350 in the one or more cell trace data 380(1)-380(L).

With continuing reference to FIG. 13B, in another non-limiting example, the outdoor client device 338 may generate the QoE report 376 by measuring the downlink communications signal 328 transmitted by the remote unit 314(M), the macro network downlink communications signal 336 transmitted by the outdoor base station 334, the one or more downlink communications signals 322(1)-322(L) transmitted from the one or more indoor base stations 320(1)-320(L), the uplink communications signal 332 transmitted by the indoor client device 330, and/or the one or more uplink communications signals 326(1)-326(L) transmitted to the one or more indoor base stations 320(1)-320(L) (shown in FIG. 3). The outdoor client device 338 provides the QoE report 376 to the outdoor base station 334, which subsequently provides the QoE report 376 to the OMC 350 in the cell trace data 378. The outdoor client device 338 may also provide the QoE report 376 to the one or more indoor base stations 320(1)-320(L), which subsequently provide the QoE report 376 to the OMC 350 in the one or more cell trace data 380(1)-380(L).

With reference back to FIG. 12, the table 1200 includes a sixth row 1206, which includes performance indicator information obtained through cell statistics in the macro network 308. The report source column 502 indicates that the cell statistics are generated in the macro network 308. The report type column 504 indicates that the cell statistics are included in the macro network performance report 372, as discussed earlier in FIG. 3. The description column 506 indicates that the cell statistics include such information as call drop rate, handover failure rate, MCS related information, etc. The data collected by column 508 indicates that the cell statistics are obtained from the one or more indoor base stations 320(1)-320(L) and/or the outdoor base station 334.

As previously discussed in FIG. 3, the macro network optimization system 304 may utilize the WDS performance report 310 in conjunction with the macro network performance report 372 to determine a performance indicator(s) indicative of performance between the WDS 306 and the macro network 308. The WDS performance report 310 includes the QoE report 346 generated by the indoor client device 330 as a performance indicator, the plurality of RF signal information 344(1)-344(M) received from the plurality of remote units 314(1)-314(M), and the WDS cell trace data 366 retrieved by the controller 352. In addition, the WDS performance report 310 may also include the geo-location data 364 generated by the geo-location server 356. The macro network performance report 372, however, includes the QoE report 346, the QoE report 376 generated by the outdoor client device 338, the cell trace data 378 generated by the outdoor base station 334, and the one or more cell trace data 380(1)-380 (L) generated by the one or more indoor base stations 320(1)-320(L). By examining the WDS performance report 310 in conjunction with the macro network performance report 372, the macro network optimization system 304 is able to reconfigure the macro network elements in response to additional performance situations.

Figure 14:
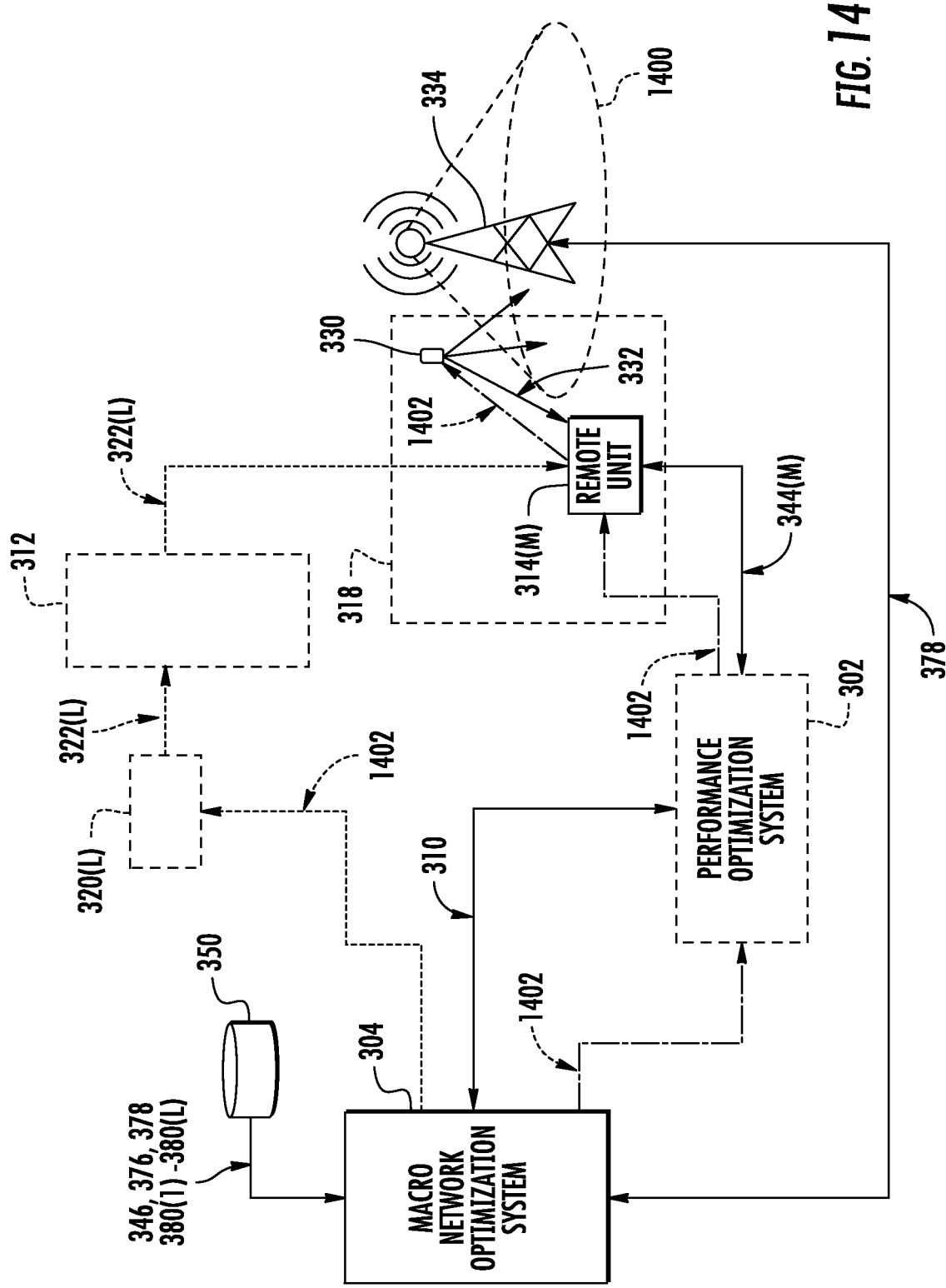
FIG. 14 is a schematic diagram providing an exemplary illustration of the macro network optimization system of FIG. 3 reconfiguring an indoor client device in response to receiving the WDS performance report and/or the macro network performance report indicating that the indoor client device is interfering with an outdoor base station in the macro network.

In this regard, FIG. 14 is a schematic diagram providing an exemplary illustration of the macro network optimization system 304 of FIG. 3 reconfiguring the indoor client device 330 in response to receiving the WDS performance report 310 and/or the macro network performance report 372 to optimize performance between the WDS 306 and the macro network 308. In this example, as discussed in more detail below, the macro network optimization system 304 reconfigures the indoor client device 330 in response to receiving the WDS performance report 310 and/or the macro network performance report 372 indicating that the indoor client device 330 is interfering with the outdoor base station 334 in the macro network 308. Common elements between FIGS. 3 and 14 are shown therein with common element numbers and will not be re-described herein.

With reference to FIG. 14, the indoor client device 330 may be located close to an edge (e.g., a window of a building) of the remote unit coverage area 318 that is adjacent to or overlaps with a coverage area 1400 of the outdoor base station 334. As such, the indoor client device 330 may be forced to transmit the uplink communications signal 332 with increased RF power. As a result, the uplink communications signal 332 transmitted by the indoor client device 330 may cause interference to the outdoor base station 334.

The outdoor base station 334 may detect the RF interference caused by the indoor client device 330 and report to the macro network optimization system 304 via the cell trace data 378. In response, the macro network optimization system 304 may reconfigure the indoor client device 330 to transmit the uplink communications signal 332 at reduced RF power and/or switch to a different RF channel/band. In a first non-limiting example, the macro network optimization system 304 may embed reconfiguration instructions 1402 in one of the one or more downlink communications signals 322(1)-322(L) (e.g., the downlink communications signal 322(L)) transmitted to the indoor client device 330 by one of the one or more indoor base stations 320(1)-320(L) (e.g., the indoor base station 320(L)). The reconfiguration instructions 1402 are different from standard power control commands (e.g., LTE power control commands) that reduce RF power of every client device in the coverage area. Instead, reconfiguration instructions 1402 embedded in the downlink communications signal 322(L) only cause the indoor client device 330 to transmit at the reduced RF power. In a second non-limiting example, it may be possible to use the standard power control commands to command every client device served by the indoor base station 320(L) to reduce RF power. In this regard, it may be necessary to restrict the coverage area of the indoor base station 320(L) to minimize impact on other indoor client devices that are not causing RF interference to the outdoor base station 334.

Figure 15:
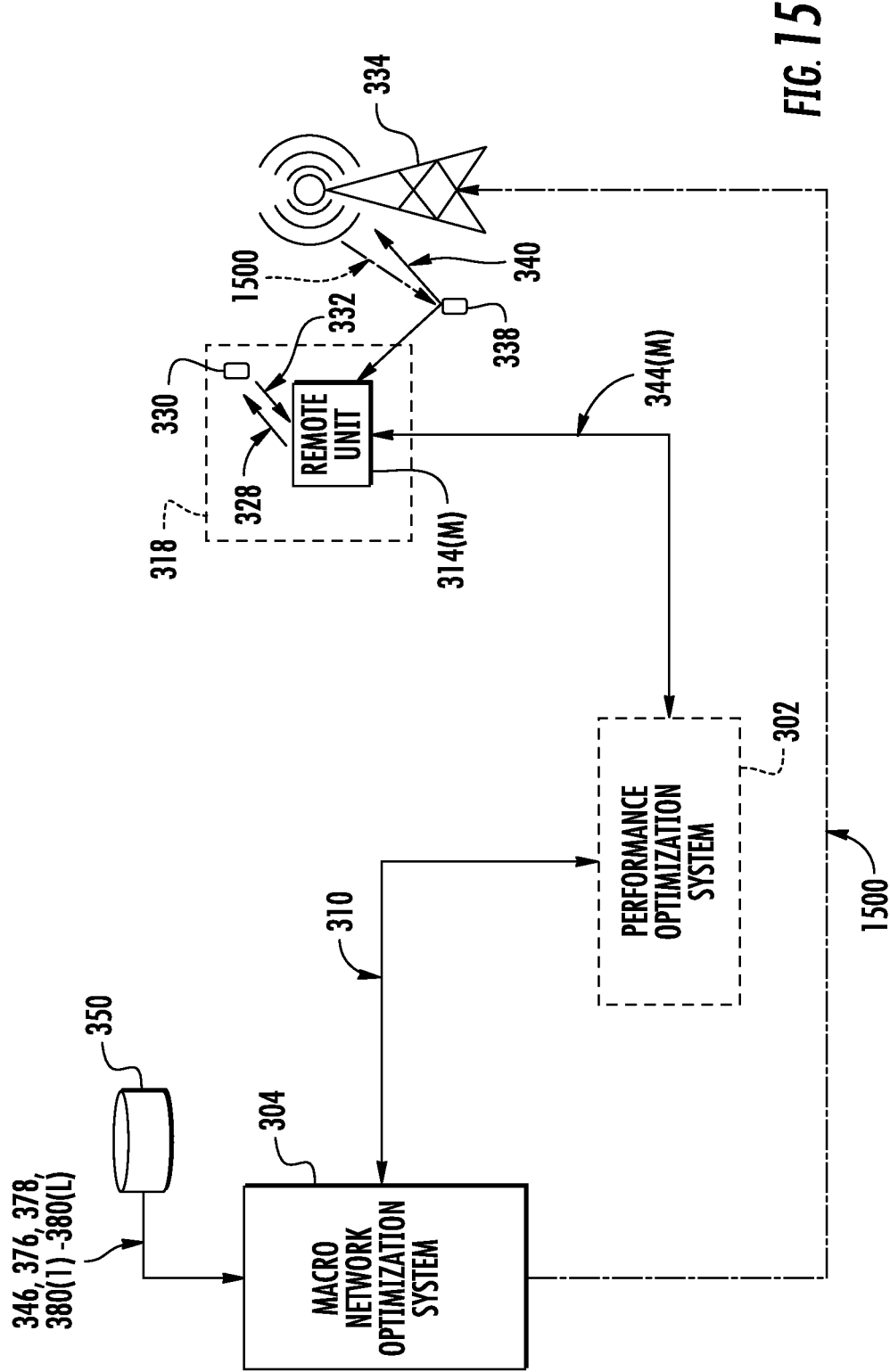
FIG. 15 is a schematic diagram providing an exemplary illustration of the macro network optimization system of FIG. 3 reconfiguring an outdoor client device in response to receiving the WDS performance report and/or the macro network performance report indicating that the outdoor client device is interfering with the WDS.

FIG. 15 is a schematic diagram providing an exemplary illustration of the macro network optimization system 304 of FIG. 3 reconfiguring the outdoor client device 338 in response to receiving the WDS performance report 310 and/or the macro network performance report 372 providing performance indicators indicative of performance between the WDS 306 and the macro network 308. In this example, as discussed in more detail below, the macro network optimization system 304 is configured to reconfigure the outdoor client device 338 in response to receiving the WDS performance report 310 and/or the macro network performance report 372 indicating the outdoor client device 338 is interfering with the WDS 306. Common elements between FIGS. 3 and 15 are shown therein with common element numbers and will not be re-described herein.

With reference to FIG. 15, the outdoor client device 338 may be located close to edge (e.g., a window of a building) of the remote unit coverage area 318 that is adjacent to the outdoor base station 334. As such, the macro network uplink communications signal 340 transmitted by the outdoor client device 338 may interfere with the remote unit 314(M) and/or the indoor client device 330.

With continuing reference to FIG. 15, the remote unit 314(M) may sniff and report the RF interference from the outdoor client device 338 via the RF signal information 344(M). In response, the macro network optimization system 304 may provide a reconfiguration signal 1500 with embedded reconfiguration comments to the outdoor client device 338. The reconfiguration signal 1500 may be communicated to the outdoor client device 338 via the outdoor base station 334. The reconfiguration commands embedded in the reconfiguration signal 1500 may cause the outdoor client device 338 to reduce RF power used to transmit the macro network uplink communications signal 340 and/or switch to a different RF channel/band. The reconfiguration commands embedded in the reconfiguration signal 1500 may cause the outdoor client device 338 to transmit the macro network uplink communications signal 340 on an alternative RF channel.

Figure 16:
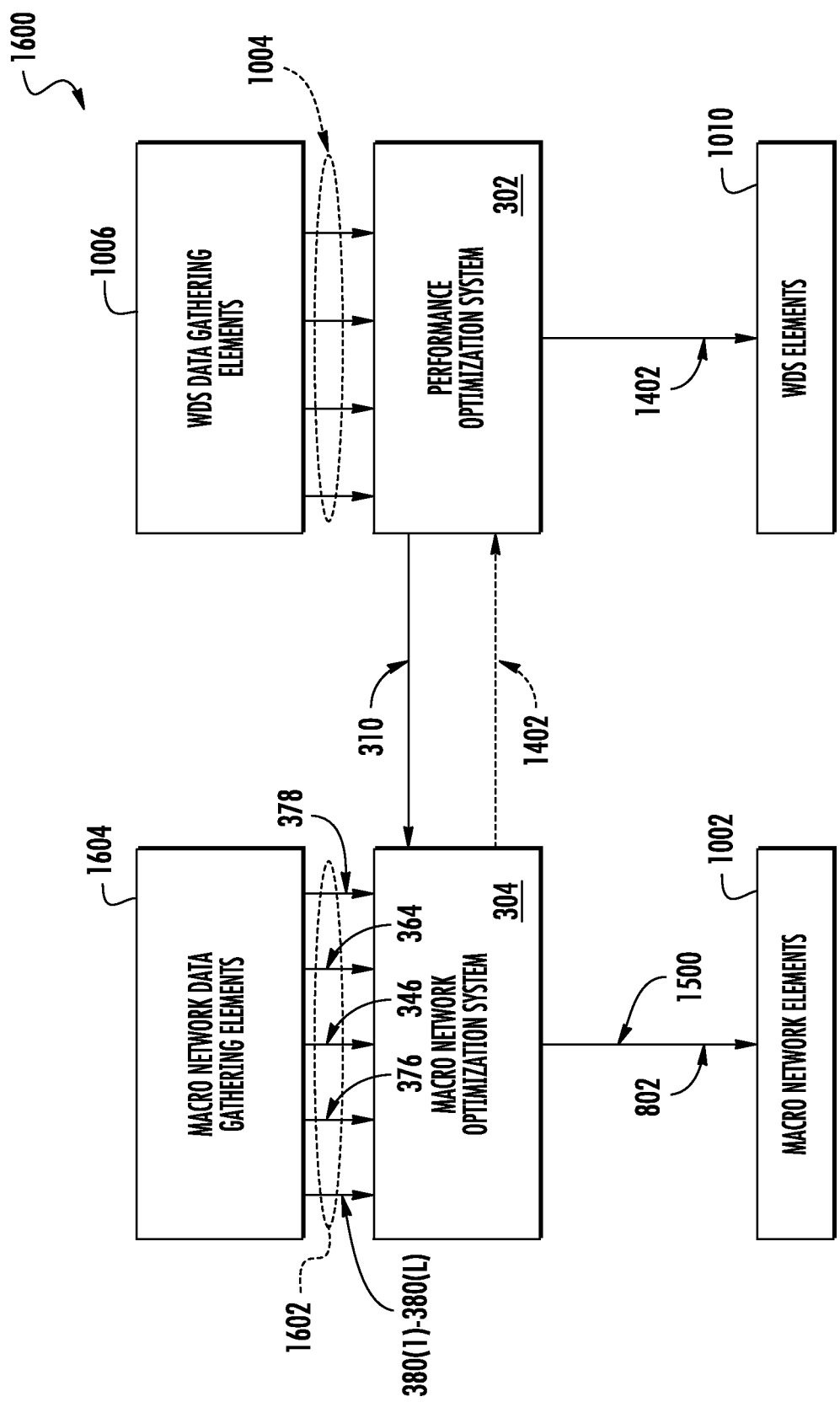
FIG. 16 is a block diagram providing an exemplary summary of the macro network optimization system of FIG. 3 that reconfigures the macro network elements of FIG. 10 and WDS elements based on the WDS performance report and the macro network performance report and according to aspects discussed in FIGS. 3-15.

FIG. 16 is a block diagram 1600 providing an exemplary summary of the macro network optimization system 304 of FIG. 3 that reconfigures the macro network elements 1002 and the WDS elements 1010 of FIG. 10 based on the WDS performance report 310 and the macro network performance report 372 according to aspects discussed in FIGS. 3-15. Common elements between FIGS. 3, 8, 10, and 16 are shown therein with common element numbers and will not be re-described herein.

With reference to FIG. 16, the macro network optimization system 304 may generate the macro network performance report 372 of FIG. 3 based on macro network data inputs 1602, which may be stored in the OMC 350 (not shown), gathered by macro network data gathering elements 1604. In a non-limiting example, according to previous discussions in FIG. 3, the macro network data gathering elements 1604 may include the indoor client device 330, the outdoor client device 338, the outdoor base station 334, and the one or more indoor base stations 320(1)-320(L). Accordingly, the macro network data inputs 1602 may include the QoE report 346 provided by the indoor client device 330, the QoE report 376 provided by the outdoor client device 338, the cell trace data 378 provided by the outdoor base station 334, and the one or more cell trace data 380(1)-380(L) provided by the one or more indoor base stations 320(1)-320(L). In addition, the macro network data input 1602 may also include the geo-location data 364 generated by the geo-location server 356.

Upon determining the performance between the WDS 306 and the macro network 308 based on the WDS performance report 310 and the macro network performance report 372, the macro network optimization system 304 reconfigures the macro network elements 1002 to optimize the performance between the WDS 306 and the macro network 308. For example, as previously discussed in FIG. 15, the macro network optimization system 304 may reconfigure the outdoor client device 338 via the reconfiguration signal 1500. Further, as previously discussed in FIG. 14, the macro network optimization system 304 may also reconfigure the indoor client device 330 via the reconfiguration instructions 1402.

Figure 17:
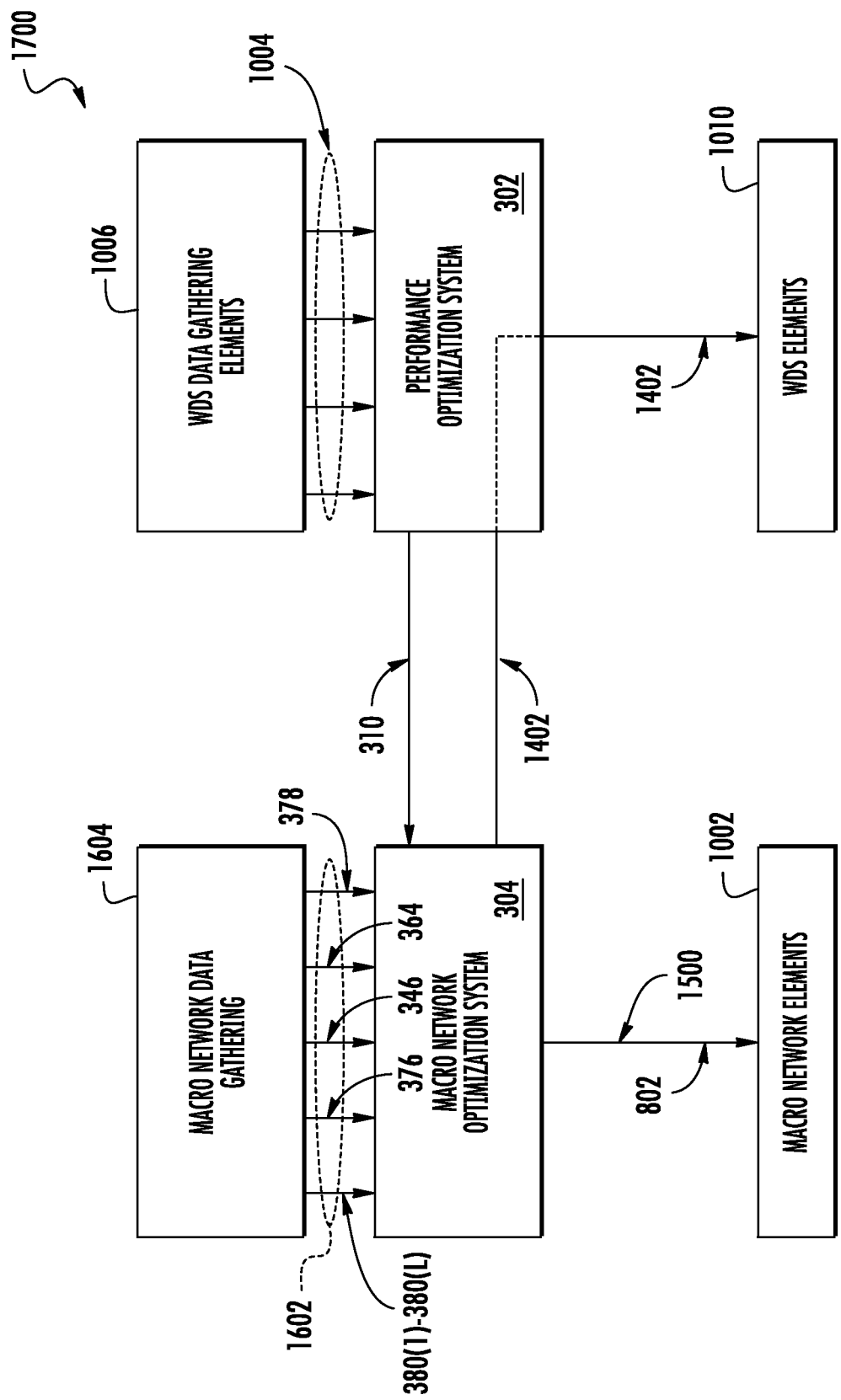
FIG. 17 is a block diagram providing another exemplary summary of the macro network optimization system of FIG. 3 that reconfigures the macro network elements of FIG. 10 and WDS elements based on the WDS performance report and the macro network performance report and according to aspects discussed in FIGS. 3-15.

FIG. 17 is a block diagram 1700 providing another exemplary summary of the macro network optimization system 304 of FIG. 3 that reconfigures the macro network elements 1002 and the WDS elements 1010 of FIG. 10 based on the WDS performance report 310, and the macro network performance report 372, and according to aspects discussed in FIGS. 3-15. Common elements between FIGS. 3, 8, 10, 16, and 17 are shown therein with common element numbers and will not be re-described herein.

With reference to FIG. 17, upon determining that the RF interference exists between the WDS 306 and the macro network 308 based on the WDS performance report 310 and the macro network performance report 372, the macro network optimization system 304 reconfigures the macro network elements 1002 to optimize the performance between the WDS 306 and the macro network 308. In this example, the macro network optimization system 304 reconfigures the macro network elements 1002 to reduce the RF interference between the WDS 306 and the macro network 308. For example, as previously discussed in FIG. 14, the macro network optimization system 304 may reconfigure the indoor client device 330 directly via the reconfiguration commands embedded in the reconfiguration instructions 1402.

As previously discussed in FIG. 3, the macro network optimization system 304 may generate the macro network performance report 372 that includes QoE and other related data generated by the indoor client device 330, the outdoor client device 338, the outdoor base station 334, and/or the one or more indoor base stations 320(1)-320(L). The macro network optimization system 304 provides the macro network performance report 372 to the performance optimization system 302. Further according to discussions in FIG. 10, the performance optimization system 302 receives the WDS data inputs 1004 from the WDS data gathering elements 1006, which includes the plurality of RF signal information 344(1)-344(M), the QoE report 346, the geo-location data 364, the WDS cell trace data 366, and so on, and generates the WDS performance report 310. In this regard, the performance optimization system 302 may analyze the macro network performance report 372 in conjunction with the WDS performance report 310 to determine the types and levels of RF interferences that may exist between the WDS 306 and the macro network 308. Upon determining that the RF interference exists between the WDS 306 and the macro network 308, the performance optimization system 302 may reconfigure the WDS elements 1010, such as the central unit 312 and the plurality of remote units 314(1)-314(M) in the WDS 306 for example, to reduce the RF interference between the WDS 306 and the macro network 308. If, for example, the performance optimization system 302 determines that the downlink communications signal 328 transmitted by the remote unit 314(M) causes RF interference with the macro network downlink communications signal 336 transmitted by the outdoor base station 334 or the downlink communications signal 322(L) transmitted by the indoor base station 320(L), the performance optimization system 302 may reconfigure the remote unit 314(M) to transmit at reduced power, change radiation pattern, and/or switch to a different RF channel/band to reduce the RF interference to the outdoor base station 334 or the indoor base station 320(L). In addition, the performance optimization system 302 may also reconfigure the remote unit 314(M) to transmit in an alternative RF channel to reduce the determined RF interference between the WDS 306 and the macro network 308.

When the macro network optimization system 304 reconfigures the macro network elements 1002, for example reducing transmitting power of the outdoor client device 338, adjusting antenna tilt of the outdoor base station 334, or changing radiation pattern of the outdoor base station 334, user experiences in the WDS 306 and the macro network 308 are both affected. In one aspect, the indoor client device 330 and the remote unit 314(M) may provide improved user experience due to reduced RF interferences from the outdoor base station 334 and/or the outdoor client device 338. In another aspect, however, the coverage range of the outdoor base station 334 may be reduced and the outdoor client device 338 may provide worsened user experience. Likewise, when the performance optimization system 302 reconfigures the WDS elements 1010, for example reducing transmitting power of the remote unit 314(M) and/or the indoor client device 330, or switching the remote unit 314(M) to change to a different RF channel/band, the user experiences in the WDS 306 and the macro network 308 are also affected. On one hand, the outdoor base station 334 and the outdoor client device 338 may provide improved user experience due to reduced RF interference from the remote unit 314(M) and/or the indoor client device 330. On the other hand, the coverage range of the remote unit 314(M) may be reduced and the indoor client device 330 may provide worsened user experience. As such, it may be desired to monitor the user experiences and make proper tradeoffs in both the WDS 306 and the macro network 308 to ensure overall user experiences in both the WDS 306 and the macro network 308 are optimized to meet specific performance targets.

Figure 18:
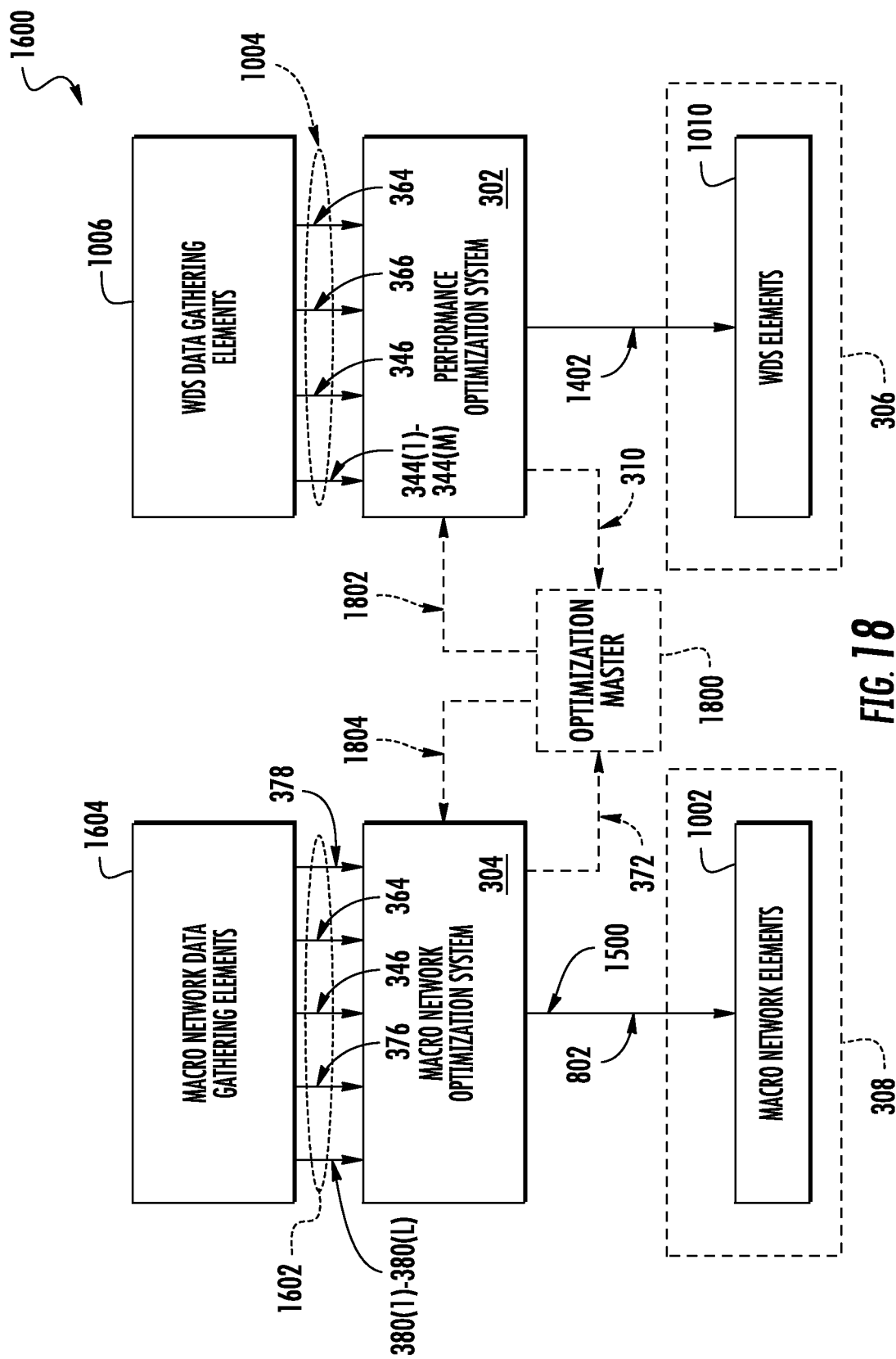
FIG. 18 is a schematic diagram of an exemplary optimization master configured to ensure that overall user experience in the WDS and the macro network of FIG. 3 is optimized to meet predefined performance targets.

In this regard, FIG. 18 is a schematic diagram of an exemplary optimization master 1800 configured to ensure that overall user experience in the WDS 306 and the macro network 308 of FIG. 3 is optimized to meet predefined performance targets. Common elements between FIGS. 3, 8, 10, 16, and 18 are shown therein with common element numbers and will not be re-described herein. With reference to FIG. 18, in a first non-limiting example, the optimization master 1800 may be provided in the macro network optimization system 304. In a second non-limiting example, the optimization master 1800 may be provided in the performance optimization system 302. In a third non-limiting example, functionalities of the optimization master 1800 may be split between the performance optimization system 302 and the macro network optimization system 304.

In one embodiment, the optimization master 1800 receives the WDS performance report 310 from the performance optimization system 302. The optimization master 1800 analyzes the WDS performance report 310 to determine whether QoE in the macro network 308 can be optimized (e.g., RF interference exists that can be reduced or eliminated). In a non-limiting example, the QoE in the macro network 308 refers to the QoE in areas surrounding a building(s) in which the WDS 306 is deployed and may be impacted by activities of the WDS 306 inside the building(s). Upon determining that the QoE in the macro network 308 can be optimized, the optimization master 1800 may instruct the macro network optimization system 304 to reconfigure the macro network elements 1002 to optimize the QoE in the macro network 308. Specifically, the optimization master 1800 may instruct the macro network optimization system 304 to reconfigure the macro network elements 1002 to reduce the RF interference that is determined to exist between the WDS 306 and the macro network 308 based on the detected RF interference between the WDS 306 and the macro network 308. The RF interference that is determined to exist between the WDS 306 and the macro network 308 may be caused by the WDS 306 and/or the macro network 308. In one non-limiting example, the optimization master 1800 may instruct the macro network optimization system 304 to reconfigure the outdoor base station 334 in the macro network 308 to reduce the RF interference between the WDS 306 and the macro network 308 if the RF interference determined to exist between the WDS 306 and the macro network 308 is caused by the outdoor base station 334. Accordingly, the macro network optimization system 304 may cause the outdoor base station 334 to transmit at reduced power, tilt an antenna, transmit in an alternative RF channel, and/or change radiation pattern. In another non-limiting example, the optimization master 1800 may instruct the macro network optimization system 304 to reconfigure the outdoor client device 338 in the macro network 308 to reduce the RF interference between the WDS 306 and the macro network 308 if the RF interference determined to exist between the WDS 306 and the macro network 308 is caused by the outdoor client device 338. Accordingly, the macro network optimization system 304 may cause the outdoor client device 338 to reduce transmit power and/or transmit in an alternative RF channel.

In another embodiment, the optimization master 1800 receives the WDS performance report 310 and the macro network performance report 372 from the performance optimization system 302 and the macro network optimization system 304, respectively. The optimization master 1800 analyzes the WDS performance report 310 and the macro network performance report 372 to determine whether QoE in the macro network 308 can be optimized (e.g., RF interference exists that can be reduced or eliminated). Upon determining that the QoE in the macro network 308 can be optimized, the optimization master 1800 may instruct the macro network optimization system 304 to reconfigure the macro network elements 1002 to optimize the QoE in the macro network 308. Specifically, the optimization master 1800 may instruct the macro network optimization system 304 to reconfigure the macro network elements 1002 to reduce the RF interference that is determined to exist between the WDS 306 and the macro network 308 based on the detected RF interference between the WDS 306 and the macro network 308. In one non-limiting example, the optimization master 1800 may instruct the macro network optimization system 304 to reconfigure the outdoor base station 334 in the macro network 308 to reduce the RF interference between the WDS 306 and the macro network 308 if the RF interference determined to exist between the WDS 306 and the macro network 308 is caused by the outdoor base station 334. Accordingly, the macro network optimization system 304 may cause the outdoor base station 334 to reduce transmit power, tilt an antenna, transmit in an alternative RF channel, and/or change radiation pattern. In another non-limiting example, the optimization master 1800 may instruct the macro network optimization system 304 to reconfigure the outdoor client device 338 in the macro network 308 to reduce the RF interference between the WDS 306 and the macro network 308 if the RF interference determined to exist between the WDS 306 and the macro network 308 is caused by the outdoor client device 338. Accordingly, the macro network optimization system 304 may cause the outdoor client device 338 to reduce transmit power and/or transmit in an alternative RF channel.

In another embodiment, the optimization master 1800 receives the macro network performance report 372 from the macro network optimization system 304. The optimization master 1800 analyzes the macro network performance report 372 to determine whether QoE in the WDS 306 can be optimized (e.g., RF interference exists that can be reduced or eliminated). Upon determining that the QoE in the WDS 306 can be optimized, the optimization master 1800 may instruct the performance optimization system 302 to reconfigure the WDS elements 1010 to optimize the QoE in the WDS 306. Specifically, the optimization master 1800 may instruct the performance optimization system 302 to reconfigure the WDS elements 1010 to reduce the RF interference that is determined to exist between the WDS 306 and the macro network 308 based on the detected RF interference between the WDS 306 and the macro network 308. The RF interference that is determined to exist between the WDS 306 and the macro network 308 may be caused by the WDS 306 and/or the macro network 308. In one non-limiting example, the optimization master 1800 may instruct the performance optimization system 302 to reconfigure the remote unit 314(M) in the WDS 306 to transmit at a reduced power to reduce the RF interference between the WDS 306 and the macro network 308 if the RF interference determined to exist between the WDS 306 and the macro network 308 is caused by the remote unit 314(M). Accordingly, the performance optimization system 302 may cause the remote unit 314(M) to change radiation pattern and/or transmit in an alternative RF channel. In another non-limiting example, the optimization master 1800 may instruct the performance optimization system 302 to cause the indoor client device 330 in the WDS 306 to transmit at reduced power to reduce the RF interference between the WDS 306 and the macro network 308 if the RF interference determined to exist between the WDS 306 and the macro network 308 is caused by the indoor client device 330. Accordingly, the performance optimization system 302 may cause the indoor client device 330 to transmit in an alternative RF channel.

In another embodiment, the optimization master 1800 receives the WDS performance report 310 and the macro network performance report 372 from the performance optimization system 302 and the macro network optimization system 304, respectively. The optimization master 1800 analyzes the WDS performance report 310 and the macro network performance report 372 to determine whether QoE in the WDS 306 can be optimized (e.g., RF interference exists that can be reduced or eliminated). Upon determining that the QoE in the WDS 306 can be optimized, the optimization master 1800 may instruct the performance optimization system 302 to reconfigure the WDS elements 1010 to optimize the QoE in the WDS 306. Specifically, the optimization master 1800 may instruct the performance optimization system 302 to reconfigure the WDS elements 1010 to reduce the RF interference that is determined to exist between the WDS 306 and the macro network 308 based on the detected RF interference between the WDS 306 and the macro network 308. In one non-limiting example, the optimization master 1800 may instruct the performance optimization system 302 to reconfigure the remote unit 314(M) in the WDS 306 to transmit at reduced power to reduce the RF interference between the WDS 306 and the macro network 308 if the RF interference determined to exist between the WDS 306 and the macro network 308 is caused by the remote unit 314(M). Accordingly, the performance optimization system 302 may reconfigure the remote unit 314(M) to change radiation pattern and/or transmit in an alternative RF channel. In another non-limiting example, the optimization master 1800 may instruct the performance optimization system 302 to cause the indoor client device 330 in the WDS 306 to transmit at reduced power to reduce the RF interference between the WDS 306 and the macro network 308 if the RF interference determined to exist between the WDS 306 and the macro network 308 is caused by the indoor client device 330. Accordingly, the performance optimization system 302 may cause the indoor client device 330 to reduce transmit power and/or transmit in an alternative RF channel.

In another embodiment, the optimization master 1800 receives the WDS performance report 310 and the macro network performance report 372 from the performance optimization system 302 and the macro network optimization system 304, respectively. In a non-limiting example, the optimization master 1800 may receive the WDS performance report 310 and the macro network performance report 372 periodically or by request. As such, the optimization master 1800 can continuously monitor the WDS performance report 310 and the macro network performance report 372 to determine whether the overall user experiences in both the WDS 306 and the macro network 308 are meeting the predefined performance targets. In a non-limiting example, the predefined performance targets may be expressed in Equation 1 (Eq. 1) below.

$$F=a_1Q_1+a_2Q_2+a_3Q_3+a_4Q_4 \quad \text{(Eq. 1)}$$

According to Equation 1, F represents the predefined performance targets for the WDS 306 and the macro network 308. In a non-limiting example, the predefined performance targets may be provided as a matrix that includes, but is not limited to, such parameters as call drop rate, call quality, data throughput, network capacity, connection latency, coverage range, handover delay, etc. In Equation 1, $Q_1$, $Q_2$, $Q_3$, and $Q_4$ are experience factors. In a first non-limiting example, $Q_1$ denotes a change in QoE of users in the macro network 308 following reconfigurations in the macro network 308. $Q_2$ denotes a change in QoE of users in the macro network 308 following reconfigurations in the WDS 306. $Q_3$ denotes a change in QoE of users in the WDS 306 following reconfigurations in the macro network 308. $Q_4$ denotes a change in QoE of users in the WDS 306 following reconfigurations in the WDS 306. In a second non-limiting example, $Q_1$ denotes a QoE score associated with the macro network 308 following reconfigurations in the macro network 308. $Q_2$ denotes a QoE score associated with the macro network 308 following reconfigurations in the WDS 306. $Q_3$ denotes a QoE score associated with the WDS 306 following reconfigurations in the macro network 308. $Q_4$ denotes a QoE score associated with the WDS 306 following reconfigurations in the WDS 306.

The optimization master 1800 can analyze the WDS performance report 310 and the macro network performance report 372 to determine each of the experience factors $Q_1$, $Q_2$, $Q_3$, and $Q_4$ on a continuous basis. If the optimization master 1800 determines that the predefined performance target (F) is not met, the optimization master 1800 can instruct the performance optimization system 302 and/or the macro network optimization system 304 to make proper reconfigurations to meet the predefined performance target (F). In a non-limiting example, the optimization master 1800 may instruct the performance optimization system 302 to reconfigure the WDS elements 1010 by providing one or more WDS reconfiguration instructions 1802. The optimization master 1800 may instruct the macro network optimization system 304 to reconfigure the macro network elements 1002 by providing one or more macro network reconfiguration instructions 1804.

Equation 1 also includes weight factors $a_1$, $a_2$, $a_3$, and as that correspond to the experience factors $Q_1$, $Q_2$, $Q_3$, and $Q_4$, respectively. The weight factors $a_1$, $a_2$, $a_3$, and $a_4$ define relative importance of the experience factors $Q_1$, $Q_2$, $Q_3$, and $Q_4$ towards the predefined performance target (F). In this regard, the optimization master 1800 may use the weight factors $a_1$, $a_2$, $a_3$, and $a_4$ to help determine the proper reconfigurations in the WDS 306 and/or the macro network 308 to meet the predefined performance target (F). The weight factors $a_1$, $a_2$, $a_3$, and as may be determined dynamically or statically. In a non-limiting example, the weight factors $a_1$, $a_2$, $a_3$, and $a_4$ may be determined based on QoE related KPIs set by wireless service providers. In another non-limiting example, the weight factors $a_1$, $a_2$, $a_3$, and $a_4$ may be determined based on the number of users (e.g., WDS user and/or macro network user) whose QoE have been impacted by prior reconfigurations in the WDS 306 and/or the macro network 308.

As previously discussed, by optimizing performance between the WDS 306 and the macro network 308, it is also possible to provide handover optimizations in the WDS 306 and the macro network 308. In this regard, the handover optimization includes reducing high handover rate and/or high handover failure rate in the WDS 306 and the macro network 308. In a first handover scenario, the indoor client device 330 is in a handover from the remote unit 314(M) associated with the indoor base station 320(L) in the WDS 306 to the outdoor base station 334 in the macro network 308. As such, the indoor base station 320(L) is a handover source, and the outdoor base station 334 is a handover destination. In a second handover scenario, the outdoor client device 338 is in a handover from the outdoor base station 334 in the macro network 308 to the remote unit 314(M) associated with the indoor base station 320(L) in the WDS 306. As such, the outdoor base station 334 is the handover source, and the indoor base station 320(L) is the handover destination.

In a non-limiting example, the high handover rate is also known as a "ping pong" event, in which the indoor client device 330 and/or the outdoor client device 338 bounce between the remote unit 314(M) in the WDS 306 and the outdoor base station 334 in the macro network 308 in a given period of time. In another non-limiting example, handover failure rate includes inbound handover failure and outbound handover failure. The inbound handover failure refers to a failed handover attempt by the outdoor client device 338, which is located inside a perimeter (e.g., building) of the WDS 306 while being serviced by the outdoor base station 334, to handover from the outdoor base station 334 to the remote unit 314(M). The outbound handover failure refers to a failed handover attempt by the indoor client device 330 to handover from the remote unit 314(M) to the outdoor base station 334.

Evidence for high handover rate and/or high handover failure rate can be retrieved from both the handover source and the handover destination. For example, when the indoor client device 330 is in a handover from the remote unit 314(M) associated with the indoor base station 320(L) in the WDS 306 to the outdoor base station 334 in the macro network 308, the evidence for high handover rate and/or high handover failure rate can be retrieved from the indoor base station 320(L). The macro network optimization system 304 may get an indication on handover-related issues and trigger the handover optimization process. The macro network optimization system 304 or the optimization master 1800 can then analyze data related to the indoor client device 330 (in the first handover scenario) or the outdoor client device 338 (in the second handover scenario) that understand the remote unit 314(M) associated with the indoor base station 320(L) or the outdoor base station 334 experiencing the high handover rate and/or high handover failure rate.

Data on handover-related performance from the outdoor base station 334 is obtained in the macro network 308. Data on handover-related performance from the indoor base station 320(L), with which the remote unit 314(M) is associated, could be obtained in the macro network 308 or the WDS 306. Data on the behavior of the indoor client device 330 or the outdoor client device 338, which is required to understand the remote unit 314(M) associated with the indoor base station 320(L) or the outdoor base station 334 experiencing the high handover rate and/or high handover failure rate, can be obtained in the WDS 306. In a non-limiting example, such data can be collected from cell trace data in the outdoor base station 334, call trace data, and/or radio network information system (RNIS).

In response to detecting the high handover rate and/or the high handover failure rate, the macro network optimization system 304 can reconfigure the one or more macro network elements 1002 and/or the one or more WDS elements 1010 to improve handover performance in the macro network 308. In a non-limiting example, the macro network optimization system 304 can change handover parameters (thresholds and timers) of the outdoor base station 334. The macro network optimization system 304 can also change parameters related to a handover reporting mechanism at the indoor client device 330 (in case of outbound handover failure) or the outdoor client device 338 (in case of inbound handover failure). The parameters related to the handover reporting mechanism may include received signal levels that trigger a handover report in response to a change occurring in the macro network 308 and/or the WDS 306.

In response to detecting the high handover rate and/or the high handover failure rate, the performance optimization system 302 can reconfigure the one or more WDS elements 1010 to improve handover performance in the WDS 306. In a non-limiting example, the performance optimization system 302 can reconfigure the remote unit 314(M) associated with the indoor base station 320(L) to transmit at increased power. The performance optimization system 302 may reconfigure all of the remote units 314(1)-314(M) in the WDS 306 to transmit at the increased power. Alternatively, the performance optimization system 302 may reconfigure only the remote unit 314(M) associated with the indoor base station 320(L) to transmit at the increased power. In a non-limiting example, the remote unit 314(M) is closer to a perimeter of a building at a side of the outdoor base station 334 that is experiencing high handover rate and/or high handover failure rate. The performance optimization system 302 can also reconfigure a remote unit(s) among the remote units 314(1)-314(M) located at certain floors or areas of the building to transmit at the increased power if the performance optimization system 302 determines that the remote unit(s) is more likely to experience the high handover rate and/or the high handover failure rate. The performance optimization system 302 may choose to reconfigure the remote units 314(1)-314(M) one by one to transmit at the increased power. As such, the macro network optimization system 304 and/or the optimization master 1800 can evaluate an impact of power change on handover rate and/or handover failure rate. The impact of the power change at the remote units 314(1)-314(M) on handover performance between the macro network 308 and the WDS 306 is evaluated and balanced by the optimization master 1800 based on how the power change impacts such QoE parameters as interference level to macro network users at the vicinity of the building. If necessary, the optimization master 1800 may reconfigure the outdoor base station 334 to transmit at reduced power or change antenna tilt to radiate less power to the building.

The optimization master 1800 can be configured to optimize QoE in the WDS 306 and the macro network 308 according to a process. In this regard, FIG. 19 is a flowchart of an exemplary process 1900 of the optimization master 1800 of FIG. 18 for optimizing QoEs in the WDS 306 and the macro network 308.

Figure 19:
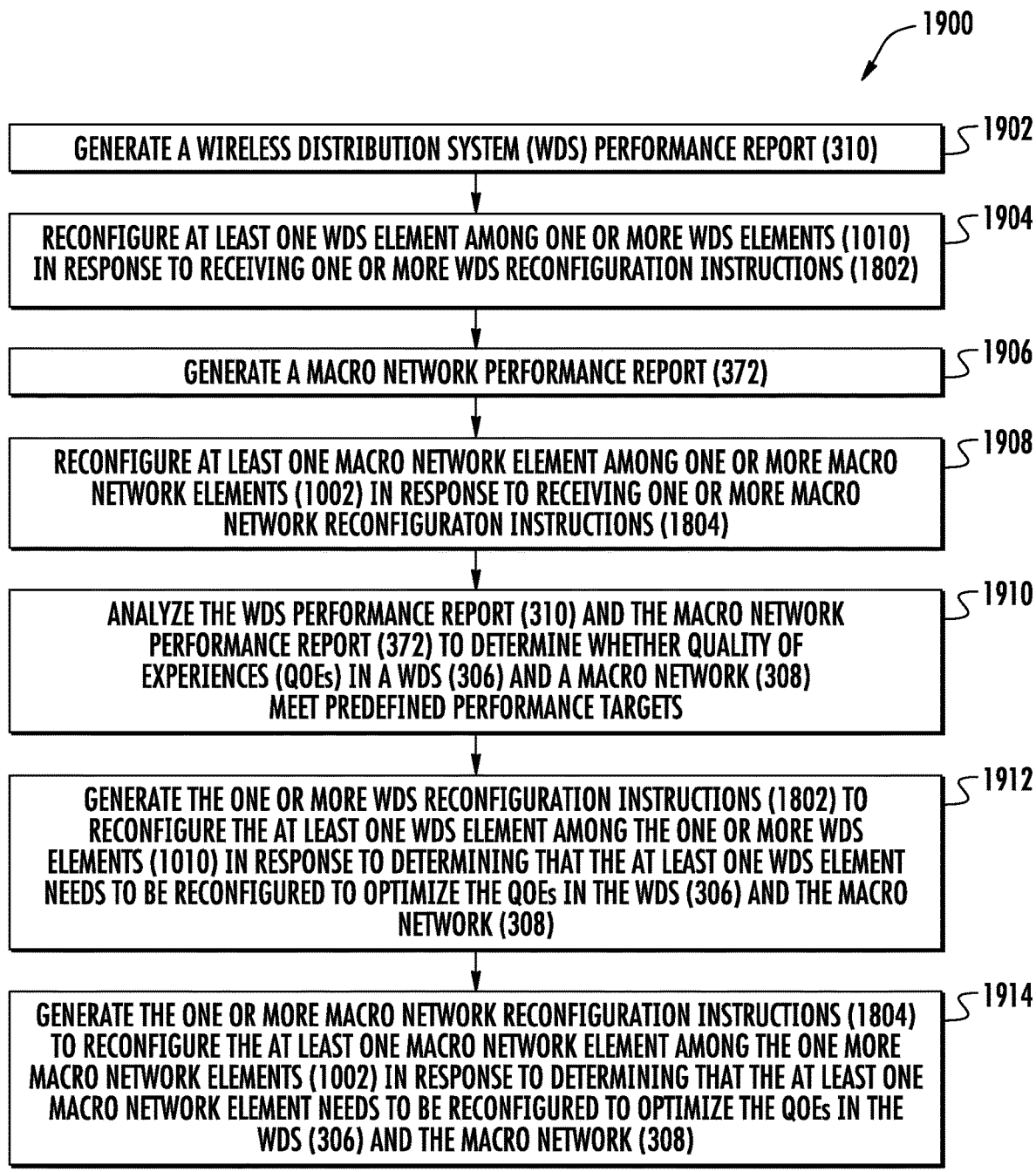
FIG. 19 is a flowchart of an exemplary process of the optimization master of FIG. 18 for optimizing QoEs in the WDS and the macro network of FIG. 3.

With reference to FIG. 19, the performance optimization system 302 generates the WDS performance report 310 (block 1902). The performance optimization system 302 reconfigures at least one WDS element among the WDS elements 1010 in response to receiving the WDS reconfiguration instructions 1802 (block 1904). The macro network optimization system 304 generates the macro network performance report 372 (block 1906). The macro network optimization system 304 reconfigures at least one macro network element among the macro network elements 1002 in response to receiving the macro network reconfiguration instructions 1804 (block 1908). The optimization master 1800 analyzes the WDS performance report 310 and the macro network performance report 372 to determine whether QoEs in the WDS 306 and the macro network 308 meet the predefined performance targets (F) (block 1910). The optimization master 1800 generates the WDS reconfiguration instructions 1802 to reconfigure the at least one WDS element among the WDS elements 1010 in response to determining that the at least one WDS element needs to be reconfigured to optimize the QoEs in the WDS 306 and the macro network 308 (block 1912). The optimization master 1800 generates the macro network reconfiguration instructions 1804 to reconfigure the at least one macro network element among the macro network elements 1002 in response to determining that the at least one macro network element needs to be reconfigured to optimize the QoEs in the WDS 306 and the macro network 308 (block 1914).

Figure 20:
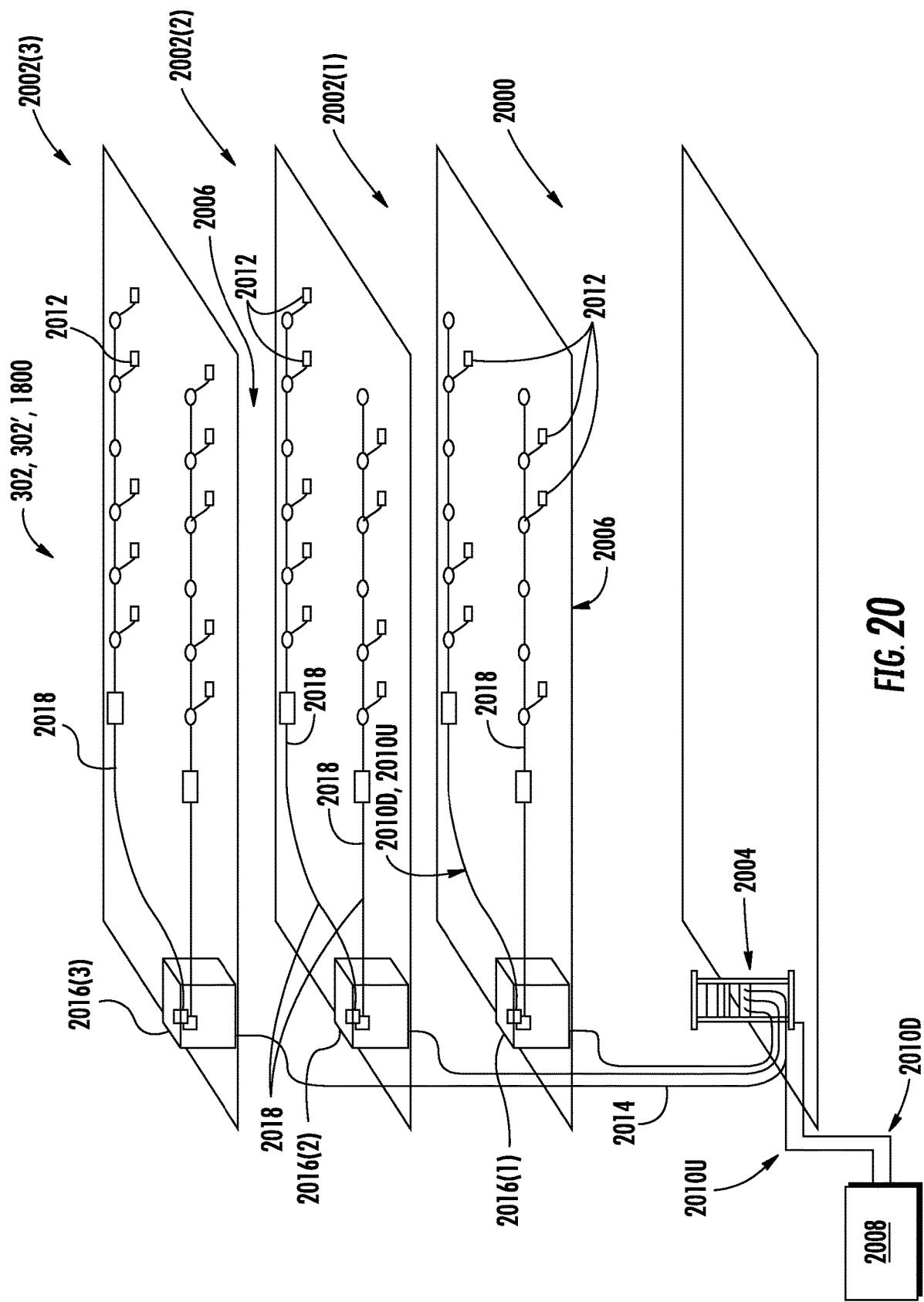
FIG. 20 is a partial schematic cut-away diagram of an exemplary building infrastructure in which the performance optimization systems of FIGS. 3 and 9 can be employed.

The performance optimization system 302 of FIG. 3, the performance optimization system 302' of FIG. 9, and the optimization master 1800 of FIG. 18 may be provided in an indoor environment, as illustrated in FIG. 20. FIG. 20 is a partial schematic cut-away diagram of an exemplary building infrastructure 2000 in which the performance optimization system 302 of FIG. 3, the performance optimization system 302' of FIG. 9, and the optimization master 1800 of FIG. 18 can be employed. The building infrastructure 2000 in this embodiment includes a first (ground) floor 2002(1), a second floor 2002(2), and a third floor 2002(3). The floors 2002(1)-2002(3) are serviced by a central unit 2004 to provide antenna coverage areas 2006 in the building infrastructure 2000. The central unit 2004 is communicatively coupled to a base station 2008 to receive downlink communications signals 2010D from the base station 2008. The central unit 2004 receives uplink communications signals 2010U from remote units 2012. The downlink communications signals 2010D and uplink communications signals 2010U communicated between the central unit 2004 and the remote units 2012 are carried over a riser cable 2014. The riser cable 2014 may be routed through interconnect units (ICUs) 2016(1)-2016(3) dedicated to each of the floors 2002(1)-2002(3) that route the downlink communications signals 2010D and uplink communications signals 2010U to the remote units 2012 and also provide power to the remote units 2012 via array cables 2018.

Figure 21:
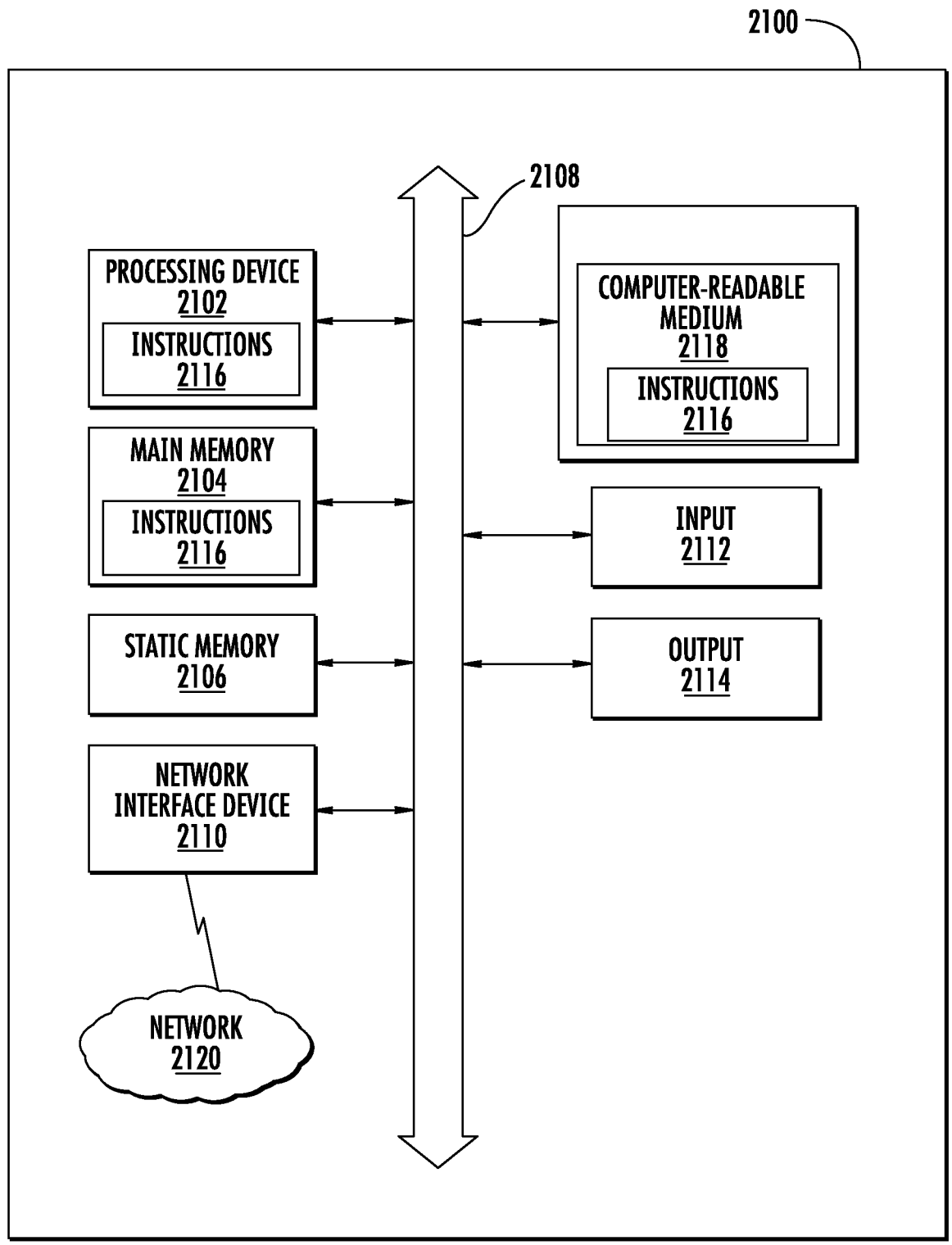
FIG. 21 is a schematic diagram illustrating additional details of an exemplary computer system that could be employed in the controllers discussed above, including, but not limited to, the macro network optimization system of FIGS. 3 and 9.

FIG. 21 is a schematic diagram illustrating additional details of an exemplary computer system 2100 that could be employed in the controllers discussed above, including, but not limited to, the macro network optimization system 304 of FIGS. 3 and 9 as well as the optimization master 1800 of FIG. 18. As discussed above, the macro network optimization system 304 is configured to determine and optimize the performance in the wireless communications system 300 of FIG. 3 and the wireless communications system 300' of FIG. 9. Further, the optimization master 1800 of FIG. 18 is configured to ensure that QoE is optimized. In this regard, the computer system 2100 is adapted to execute instructions from an exemplary computer-readable medium to perform these and/or any of the functions or processing described herein.

With reference to FIG. 21, the computer system 2100 may include a set of instructions that may be executed to determine or predict performance (e.g., frequency interference) to optimize performance (e.g., avoid or reduce RF interference) in a multi-frequency wireless communications system.

The computer system 2100 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 2100 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer.

The computer system 2100 in this embodiment includes a processing circuit ("processor 2102"), a main memory 2104 (e.g., read-only memory (ROM), flash memory, dynamic random access memory (DRAM), such as synchronous DRAM (SDRAM), etc.), and a static memory 2106 (e.g., flash memory, static random access memory (SRAM), etc.), which may communicate with each other via a data bus 2108. Alternatively, the processor 2102 may be connected to the main memory 2104 and/or the static memory 2106 directly or via some other connectivity bus or connection. The processor 2102 may be a controller like the controller 352 of FIGS. 3, 6, and 9. The main memory 2104 and the static memory 2106 may be any type of memory.

The processor 2102 may be a microprocessor, central processing unit, or the like. More particularly, the processor 2102 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 2102 is configured to execute processing logic in instructions for performing the operations and steps discussed herein.

The computer system 2100 may further include a network interface device 2110. The computer system 2100 also may or may not include an input 2112, configured to receive input and selections to be communicated to the computer system 2100 when executing instructions. The computer system 2100 also may or may not include an output 2114, including, but not limited to, a display, a video display unit (e.g., a liquid crystal display (LCD) or a cathode ray tube (CRT)), an alphanumeric input device (e.g., a keyboard), and/or a cursor control device (e.g., a mouse).

The computer system 2100 may or may not include a data storage device that includes instructions 2116 stored in a computer-readable medium 2118. The instructions 2116 may also reside, completely or at least partially, within the main memory 2104 and/or within the processor 2102 during execution thereof by the computer system 2100, the main memory 2104 and the processor 2102 also constituting the computer-readable medium 2118. The instructions 2116 may further be transmitted or received over a network 2120 via the network interface device 2110.

While the computer-readable medium 2118 is shown in an exemplary embodiment to be a single medium, the term "computer-readable medium" should be taken to include a single medium or multiple mediums (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical mediums, and magnetic mediums.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for optimizing network performance, comprising:

providing a wireless distribution system (WDS) communicatively coupled to a macro network, the WDS comprising a central unit, a plurality of interconnect units, and a plurality of distributed remote units communicatively coupled to the central unit;

receiving a macro network performance report from the macro network;

analyzing the macro network performance report to determine if at least one performance indicator indicates that radio frequency (RF) interference exists between the WDS and the macro network; and reconfiguring the one or more WDS elements to reduce the RF interference determined to exist between the WDS and the macro network based on the detected RF interference determined between the WDS and the macro network;

determining if the RF interference determined to exist between the WDS and the macro network is caused by at least one remote unit of the plurality of remote units; and causing the at least one remote unit in the WDS to reduce the RF interference between the WDS and the macro network if the RF interference determined to exist between the WDS and the macro network is caused by the at least one remote unit.

2. The method of claim 1, further comprising:
determining if the RF interference determined to exist between the WDS and the macro network is caused by at least one indoor client device; and
causing the at least one indoor client device in the WDS to reduce the RF interference between the WDS and the macro network if the RF interference determined to exist between the WDS and the macro network is caused by the at least one indoor client device.

3. The method of claim 2, further comprising reconfiguring the at least one indoor client device to transmit in an alternative RF channel to reduce the RF interference between the WDS and the macro network.

4. The method of claim 2, further comprising reconfiguring the at least one indoor client device to transmit at reduced power to reduce the RF interference between the WDS and the macro network.

5. The method of claim 1, further comprising receiving a WDS performance report and analyzing the WDS performance report and the macro network performance report to determine the at least one performance indicator between the WDS and the macro network.

6. The method of claim 5, comprising:
analyzing the WDS performance report and the macro network performance report to determine if the at least one performance indicator indicates that radio frequency (RF) interference exists between the WDS and the macro network; and
reconfiguring the one or more WDS elements to reduce the RF interference determined to exist between the WDS and the macro network based on the detected RF interference between the WDS and the macro network.

7. A method for optimizing network performance, comprising:
providing a wireless distribution system (WDS) communicatively coupled to a macro network, the WDS comprising a central unit and a plurality of distributed remote units communicatively coupled to the central unit by at least one optical fiber-based communications medium;
receiving a macro network performance report from the macro network;
analyzing the macro network performance report to determine if at least one performance indicator indicates that radio frequency (RF) interference exists between the WDS and the macro network; and
reconfiguring the one or more WDS elements to reduce the RF interference determined to exist between the WDS and the macro network based on the detected RF interference determined between the WDS and the macro network;
determining if the RF interference determined to exist between the WDS and the macro network is caused by at least one remote unit of the plurality of remote units; and
causing the at least one remote unit in the WDS to reduce the RF interference between the WDS and the macro network if the RF interference determined to exist between the WDS and the macro network is caused by the at least one remote unit.

8. The method of claim 7, further comprising receiving a WDS performance report and analyzing the WDS performance report and the macro network performance report to determine the at least one performance indicator between the WDS and the macro network.

9. The method of claim 7, further comprising:
determining if the RF interference determined to exist between the WDS and the macro network is caused by at least one indoor client device; and
causing the at least one indoor client device in the WDS to reduce the RF interference between the WDS and the macro network if the RF interference determined to exist between the WDS and the macro network is caused by the at least one indoor client device.

10. A method for optimizing network performance, comprising:
providing a wireless distribution system (WDS) communicatively coupled to a macro network, the WDS comprising a central unit and a plurality of distributed remote units optically coupled to the central unit by at least one optical fiber-based communications medium, wherein the plurality of distributed remote units comprise a plurality of antennas;
receiving a macro network performance report from the macro network;
analyzing the macro network performance report to determine if at least one performance indicator indicates that radio frequency (RF) interference exists between the WDS and the macro network; and
reconfiguring the one or more WDS elements to reduce the RF interference determined to exist between the WDS and the macro network based on the detected RF interference determined between the WDS and the macro network;
determining if the RF interference determined to exist between the WDS and the macro network is caused by at least one remote unit of the plurality of remote units; and
causing the at least one remote unit in the WDS to reduce the RF interference between the WDS and the macro network if the RF interference determined to exist between the WDS and the macro network is caused by the at least one remote unit.

11. The method of claim 10, further comprising receiving a WDS performance report and analyzing the WDS performance report and the macro network performance report to determine the at least one performance indicator between the WDS and the macro network.

12. The method of claim 10, further comprising:
determining if the RF interference determined to exist between the WDS and the macro network is caused by at least one indoor client device; and
causing the at least one indoor client device in the WDS to reduce the RF interference between the WDS and the macro network if the RF interference determined to exist between the WDS and the macro network is caused by the at least one indoor client device.

13. A method for optimizing network performance, comprising:
providing a wireless distribution system (WDS) communicatively coupled to a macro network, the WDS comprising a plurality of distributed remote units optically coupled to at least one optical fiber-based communications medium, wherein each remote unit comprises at least one antenna;
receiving a macro network performance report from the macro network;
analyzing the macro network performance report to determine if at least one performance indicator indicates that radio frequency (RF) interference exists between the WDS and the macro network; and reconfiguring the one or more WDS elements to reduce the RF interference determined to exist between the WDS and the macro network based on the detected RF interference determined between the WDS and the macro network;

determining if the RF interference determined to exist between the WDS and the macro network is caused by at least one remote unit of the plurality of remote units; and causing the at least one remote unit in the WDS to reduce the RF interference between the WDS and the macro network if the RF interference determined to exist between the WDS and the macro network is caused by the at least one remote unit.

14. The method of claim 13, further comprising receiving a WDS performance report and analyzing the WDS performance report and the macro network performance report to determine the at least one performance indicator between the WDS and the macro network.

15. The method of claim 14, comprising:

analyzing the WDS performance report and the macro network performance report to determine if the at least one performance indicator indicates that radio frequency (RF) interference exists between the WDS and the macro network; and reconfiguring the one or more WDS elements to reduce the RF interference determined to exist between the WDS and the macro network based on the detected RF interference between the WDS and the macro network.

* * * * *